(12) United States Patent
Oh et al.

(10) Patent No.: US 11,368,538 B2
(45) Date of Patent: Jun. 21, 2022

(54) PLATFORM-AGNOSTIC DRAG-AND-DROP OPERATIONS

(71) Applicant: Box, Inc., Redwood City, CA (US)

(72) Inventors: Michelle Sangeun Oh, San Francisco, CA (US); Derrik Randal Lansing, North Ogden, UT (US); Nathaniel Schlein, San Francisco, CA (US); Aaron Levie, Palo Alto, CA (US); Prachi Subhash Jadhav, Emerald Hills, CA (US); Andrew Edelman, Austin, TX (US); Faizan N. Buzdar, Redwood City, CA (US)

(73) Assignee: Box, Inc., Redwood City, CA (US)

( * ) Notice: Subject to any disclaimer, the term of this patent is extended or adjusted under 35 U.S.C. 154(b) by 0 days.

(21) Appl. No.: 17/209,224

(22) Filed: Mar. 23, 2021

(65) Prior Publication Data

US 2022/0086238 A1    Mar. 17, 2022

Related U.S. Application Data

(60) Provisional application No. 63/151,612, filed on Feb. 19, 2021, provisional application No. 62/706,865, filed on Sep. 14, 2020.

(51) Int. Cl.
*H04L 67/146* (2022.01)
*G06F 3/0486* (2013.01)
(Continued)

(52) U.S. Cl.
CPC .......... *H04L 67/146* (2013.01); *G06F 3/0486* (2013.01); *H04L 51/04* (2013.01);
(Continued)

(58) Field of Classification Search
None
See application file for complete search history.

(56) References Cited

U.S. PATENT DOCUMENTS 8,484,292 B2 *  7/2013  Spataro ............... G06Q 10/107
                                                    709/205
9,104,302 B2 *  8/2015  Chai .................... G06F 3/0486
(Continued)

OTHER PUBLICATIONS

Zoom Video Communications, Inc., "Using file sharing integrations (Box, Google Drive, Microsoft OneDrive and SharePoint)" Zoom Help Center, Last Updated Jan. 11, 2021.
(Continued)

*Primary Examiner* — Lashonda T Jacobs
(74) *Attorney, Agent, or Firm* — Vista IP Law Group, LLP

(57) ABSTRACT

A web conferencing system is hosted in a first computing environment and is Internet-connected with a content management system hosted in a second computing environment. Upon detection of an occurrence of a file or folder drag-and-drop event at the web conferencing system, the file or folder corresponding to the drag-and-drop event is made available to the content management system. A directory hierarchy of a file system of the content management system is generated on-the-fly. The content management system initiates operations to retrieve and store a copy of the file or folder into the director hierarchy. Access permissions corresponding to locations within the directory hierarchy where the copy of the file or folder is stored are established such that users of the web conferencing system who were not users of the content management system can access the copy of the file or folder that is stored in the content management system.

30 Claims, 16 Drawing Sheets

(51) Int. Cl.
*H04L 67/02* (2022.01)
*H04L 67/142* (2022.01)
*H04L 51/04* (2022.01)
*H04L 12/18* (2006.01)

(52) U.S. Cl.
CPC ............ *H04L 67/02* (2013.01); *H04L 67/142* (2013.01); *H04L 12/1813* (2013.01)

(56) References Cited

U.S. PATENT DOCUMENTS

| | | | |
|---|---|---|---|
| 9,323,442 B2* | 4/2016 | Ledet | G06F 3/0486 |
| 9,606,716 B2* | 3/2017 | Sharifi | G06F 3/0488 |
| 10,127,524 B2* | 11/2018 | Burtner | G06Q 10/103 |
| 10,291,597 B2* | 5/2019 | Li | H04L 63/10 |
| 10,516,707 B2* | 12/2019 | Griffin | H04L 12/1818 |
| 10,516,709 B2* | 12/2019 | Powell | H04M 3/567 |
| 10,866,931 B2* | 12/2020 | Lee | G06F 16/178 |
| 10,868,784 B2* | 12/2020 | Rose | H04L 51/16 |
| 10,917,608 B1* | 2/2021 | Faulkner | G06V 20/41 |
| 10,931,918 B1* | 2/2021 | Griffin | G06V 40/172 |
| 10,977,438 B2* | 4/2021 | Srinivasan | G06F 40/14 |
| 2005/0097440 A1* | 5/2005 | Lusk | G06Q 10/10 715/752 |
| 2005/0165859 A1* | 7/2005 | Geyer | G06Q 10/10 |
| 2005/0262201 A1* | 11/2005 | Rudolph | H04L 12/1831 709/205 |
| 2006/0136828 A1* | 6/2006 | Asano | G06F 3/1454 715/764 |
| 2006/0190806 A1* | 8/2006 | Sasson | G06F 16/957 707/E17.119 |
| 2007/0011231 A1* | 1/2007 | Manion | H04L 12/1827 709/204 |
| 2007/0011232 A1* | 1/2007 | Manion | H04L 12/1827 709/204 |
| 2007/0050450 A1* | 3/2007 | Manion | H04L 67/34 709/204 |
| 2007/0250351 A1* | 10/2007 | Szlam | G06Q 10/087 715/234 |
| 2007/0250531 A1* | 10/2007 | Wiggins | G06F 16/93 707/999.102 |
| 2011/0271192 A1* | 11/2011 | Jones | G06F 3/0481 709/227 |
| 2014/0032488 A1* | 1/2014 | McAfee | G06F 16/93 707/E17.008 |
| 2014/0032770 A1* | 1/2014 | Pegg | H04N 7/15 709/228 |
| 2014/0298207 A1* | 10/2014 | Ittah | G06Q 10/00 715/753 |
| 2015/0156232 A1* | 6/2015 | Sharma | G06F 3/0486 715/753 |
| 2015/0319200 A1* | 11/2015 | Nguyen | H04L 65/403 715/211 |
| 2017/0075503 A1* | 3/2017 | Chakra | H04L 67/141 |
| 2017/0097822 A1* | 4/2017 | DeLuca | G06F 8/71 |
| 2017/0185268 A1* | 6/2017 | Zeng | G06F 3/04883 |
| 2017/0357917 A1* | 12/2017 | Holmes | G06Q 10/1093 |
| 2018/0131731 A1* | 5/2018 | Jones | H04L 65/1059 |
| 2018/0234550 A1* | 8/2018 | Lifson | H04L 67/42 |
| 2018/0248835 A1* | 8/2018 | Luthra | H04L 51/32 |
| 2018/0300292 A1* | 10/2018 | Hassan | G06F 40/123 |
| 2018/0316649 A1* | 11/2018 | Testerman | H04L 63/0428 |
| 2019/0065010 A1* | 2/2019 | Masi | G06F 3/0482 |
| 2020/0104024 A1* | 4/2020 | Baba | H04N 7/152 |
| 2021/0014287 A1* | 1/2021 | Kimball | H04L 65/403 |

OTHER PUBLICATIONS

Slack, "Building simple and secure collaboration for the enterprise", Box and Slack, Mar. 4, 2020.
freeconference.com, "Web Conferencing Document Sharing" Nov. 27, 2020.
Zoom Video Communications, Inc., Global Relay Archive for Meetings, App Marketplace, Apr. 28, 2020.
Devlin, S. et al., "Slack-Integration-Play" Design-Feedback, Jul. 26, 2016.
Cisco Systems, Inc., "User Guide for Cisco Webex Meetings Server Release 4.0" Release 4.0, First Published, Apr. 4, 2019, Last Modified, May 13, 2020, Cisco Systems.
Davis, P. et al., "Zoom User Manual", Zoom User Manual for Students and Employees of New River, Last Updated, Mar. 25, 2020, New River Community and Technical Collage.
Vigliarolo, B., "How to share documents onscreen in a Zoom meeting", Mar. 24, 2020, Tech Republic.
University Information Technology Base "Sharing your screen in Adobe Connect", Archived, Knowledge Base, Last Modified, Jan. 1, 2018.
FreeConferencecall.com, Reference Book, Reference Guide, Overview Guide, Jun. 1, 2016.
Bloom, D., "Screen Sharing vs. Document Sharing: When to Use What", A Comparison of Two Useful Online Collaboration Tools, Jul. 12, 2017.
Citrix Online, LLC, "GoToMeeting User Guide", Organizing, Conducting, Presenting and Attending Web Meetings, Version 6.0, 2013.

* cited by examiner

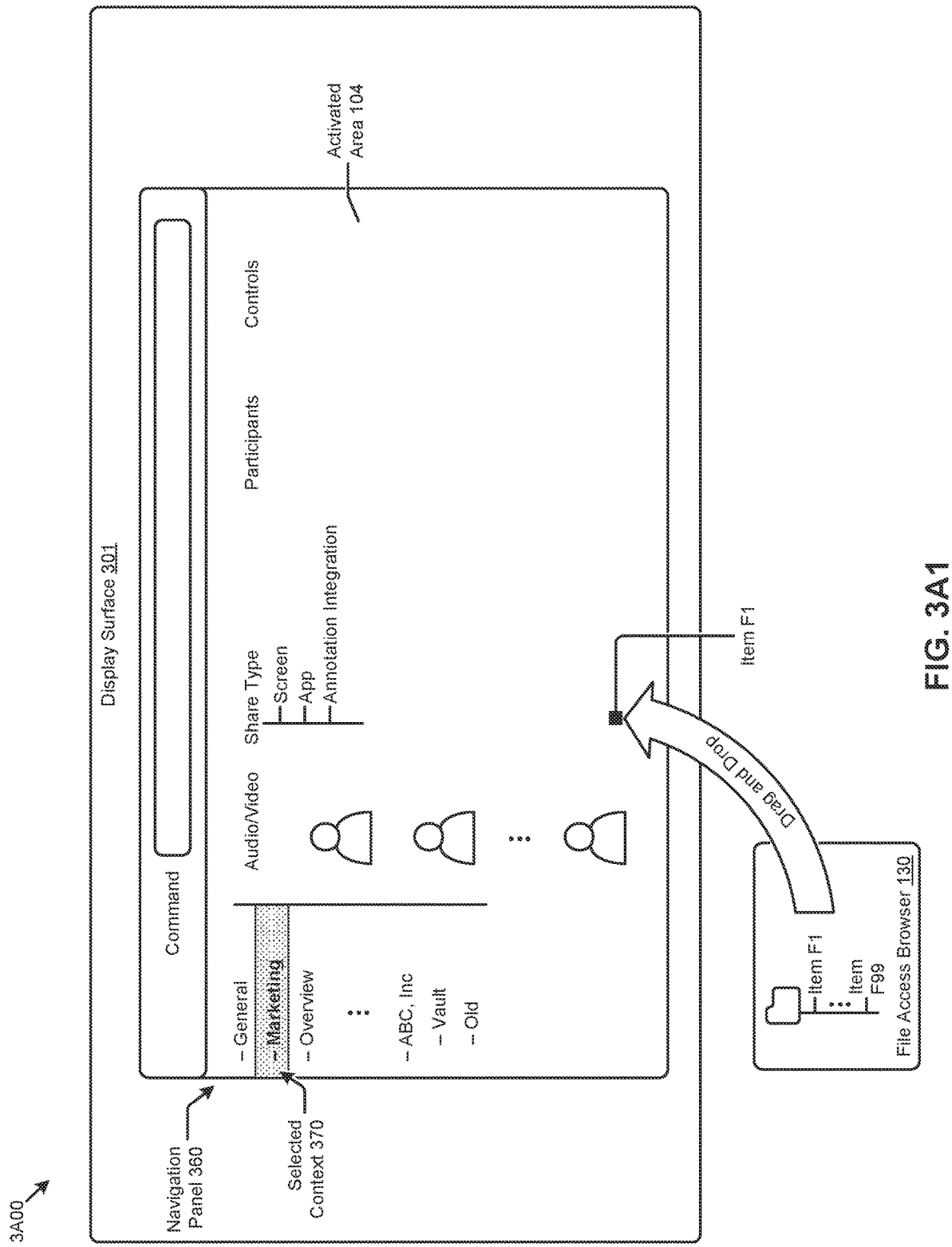
FIG. 3A1

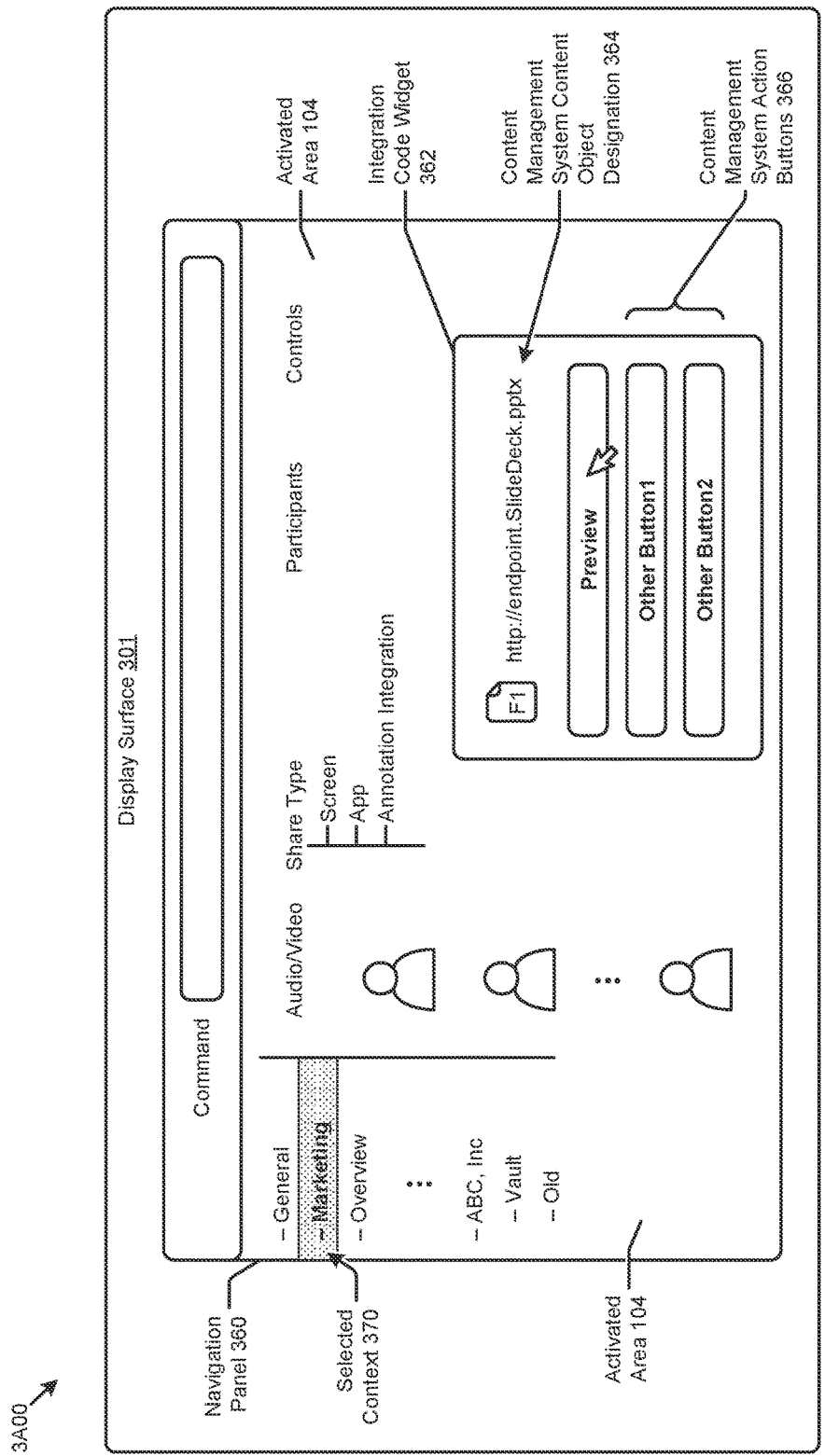
FIG. 3A2

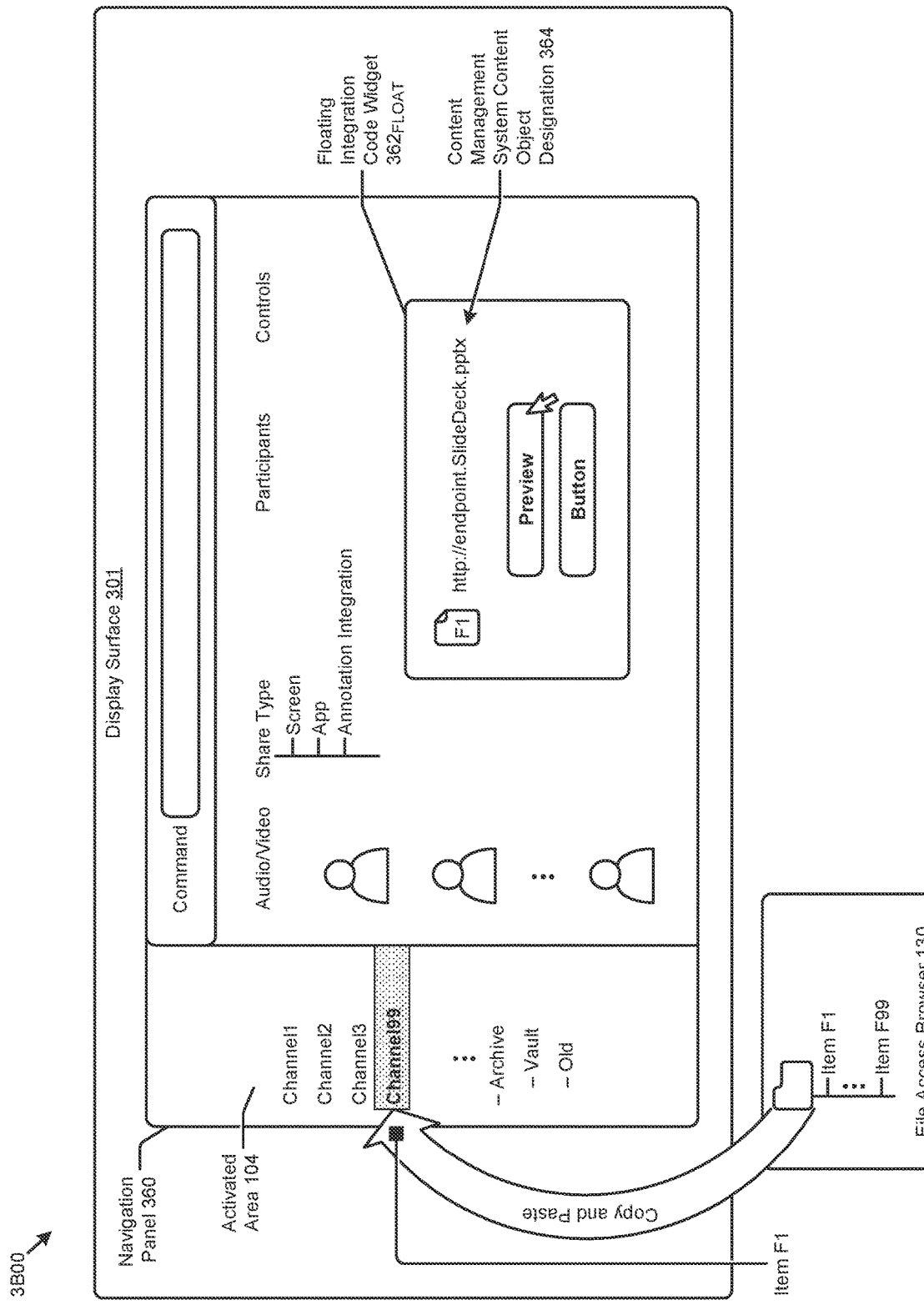
FIG. 3B1

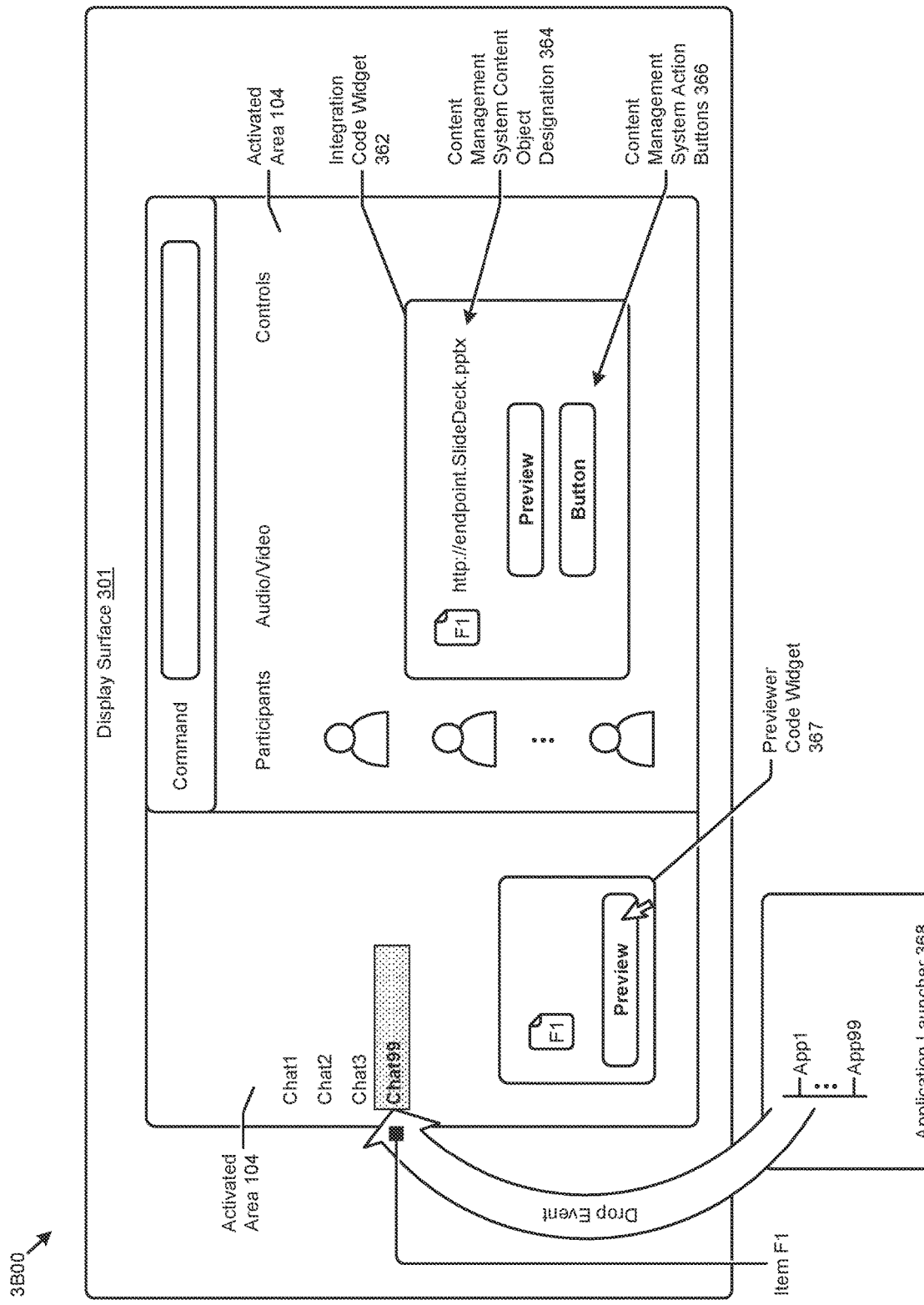
FIG. 3B2

PLATFORM-AGNOSTIC DRAG-AND-DROP OPERATIONS

RELATED APPLICATIONS

The present application claims the benefit of priority to U.S. Provisional Patent Application Ser. No. 63/151,612 titled "PLATFORM-AGNOSTIC DRAG-AND-DROP" filed on Feb. 19, 2021, which is hereby incorporated by reference in its entirety; and the present application claims the benefit of priority to U.S. Provisional Patent Application Ser. No. 62/706,865 titled "MULTI-PARTY INTEGRATIONS" filed on Sep. 14, 2020, which is hereby incorporated by reference in its entirety.

TECHNICAL FIELD

This disclosure relates to content management systems, and more particularly to techniques for platform-agnostic drag-and-drop.

BACKGROUND

It is very useful to be able to drag and drop a file or folder directly onto a surface of a messaging/collaboration facility (e.g., a web conferencing system) and to then have that file or folder automatically shared for access by the participants. The proliferation of new entrants into the messaging application space has led to a sort of "Tower of Babel" where a particular messaging facility is selected by particular sets of users based on specific features of the particular selected messaging facility. In fact, one group of users/contributors in a project (e.g., users/contributors from a first company) might prefer a text-oriented messaging facility (e.g., SLACK), whereas another group of users/contributors might prefer a video/screen-sharing system (e.g., TEAMS). In some sense, the messaging facility becomes a sort of pseudo hub for collaboration. However, content management systems are relatively well entrenched and as such, are in a position to operate as the hub of collaboration. Moreover, in most settings, the important content of a collaboration centers around a document or documents that are shared during the course of the collaboration session. That is, during a particular collaboration session, a user might want to display a document for the other participants to see, and then make that document available for the other participants to share (e.g., for editing, for commenting, or for other sorts of collaboration). One convenient way for a user (e.g., a host or other participant) to bring forward a document for collaboration is to "drag and drop" an item (e.g., document, image, folder, etc.) from the user's device onto/into an active area of the messaging facility, and then to have that item propagated to a content management system whereby all collaborators can share and collaborate over the item.

Unfortunately, there are no known techniques whereby a particular content management system can handle drag-and-drop events that originate from an arbitrary messaging facility. Moreover, there are a large number of messaging facilities that exist in varying contexts. What is needed is a way to integrate a content management system with any arbitrary messaging facility.

SUMMARY

This summary is provided to introduce a selection of concepts that are further described elsewhere in the written description and in the figures. This summary is not intended to identify key features or essential features of the claimed subject matter, nor is it intended to limit the scope of the claimed subject matter. Moreover, the individual embodiments of this disclosure each have several innovative aspects, no single one of which is solely responsible for any particular desirable attribute or end result.

The present disclosure describes techniques used in systems, methods, and in computer program products for platform-agnostic drag-and-drop operations, which techniques advance the relevant technologies to address technological issues with legacy approaches. More specifically, the present disclosure describes techniques used in systems, methods, and in computer program products for handling web conferencing system upload events in a content management system. Certain embodiments are directed to technological solutions for processing drag-and-drop events based on characteristics of a particular web conferencing system.

The disclosed embodiments modify and improve over legacy approaches. In particular, the herein-disclosed techniques provide technical solutions that address the technical problems attendant to supporting drag-and-drop operations for a wide range of web conferencing systems. Such technical solutions involve specific implementations (i.e., data organization, data communication paths, module-to-module interrelationships, etc.) that relate to the software arts for improving computer functionality.

The ordered combination of steps of the embodiments serve in the context of practical applications that perform steps for processing drag-and-drop events based on characteristics of a particular web conferencing system. As such, techniques for processing drag-and-drop events based on characteristics of a particular web conferencing system overcome heretofore unsolved technological problems associated with supporting drag-and-drop operations for a wide range of web conferencing systems.

Many of the herein-disclosed embodiments for processing drag-and-drop events based on characteristics of a particular web conferencing system are technological solutions pertaining to technological problems that arise in the hardware and software arts that underlie content management systems and/or web conferencing systems. Aspects of the present disclosure achieve performance and other improvements in peripheral technical fields including, but not limited to, improving that way that multi-party, cross-platform webapp integrations work.

Some embodiments include a sequence of instructions that are stored on a non-transitory computer readable medium. Such a sequence of instructions, when stored in memory and executed by one or more processors, causes the one or more processors to perform a set of acts for processing drag-and-drop events based on characteristics of a particular web conferencing system.

Some embodiments include the aforementioned sequence of instructions that are stored in a memory, which memory is interfaced to one or more processors such that the one or more processors can execute the sequence of instructions to cause the one or more processors to implement acts for processing drag-and-drop events based on characteristics of a particular web conferencing system.

In various embodiments, any combinations of any of the above can be organized to perform any variation of acts for handling web conferencing system upload events in a content management system, and many such combinations of aspects of the above elements are contemplated.

Further details of aspects, objectives and advantages of the technological embodiments are described herein, and in the figures and claims.

BRIEF DESCRIPTION OF THE DRAWINGS

The drawings described below are for illustration purposes only. The drawings are not intended to limit the scope of the present disclosure.

FIG. 3A1 and FIG. 3A2 depict an example web conferencing system user interface as used to launch a previewer in response to a drag-and-drop event, according to an embodiment.

FIG. 3B1 and FIG. 3B2 depict example web conferencing system user interface variations, according to some embodiments.

DETAILED DESCRIPTION

Figure 1A:
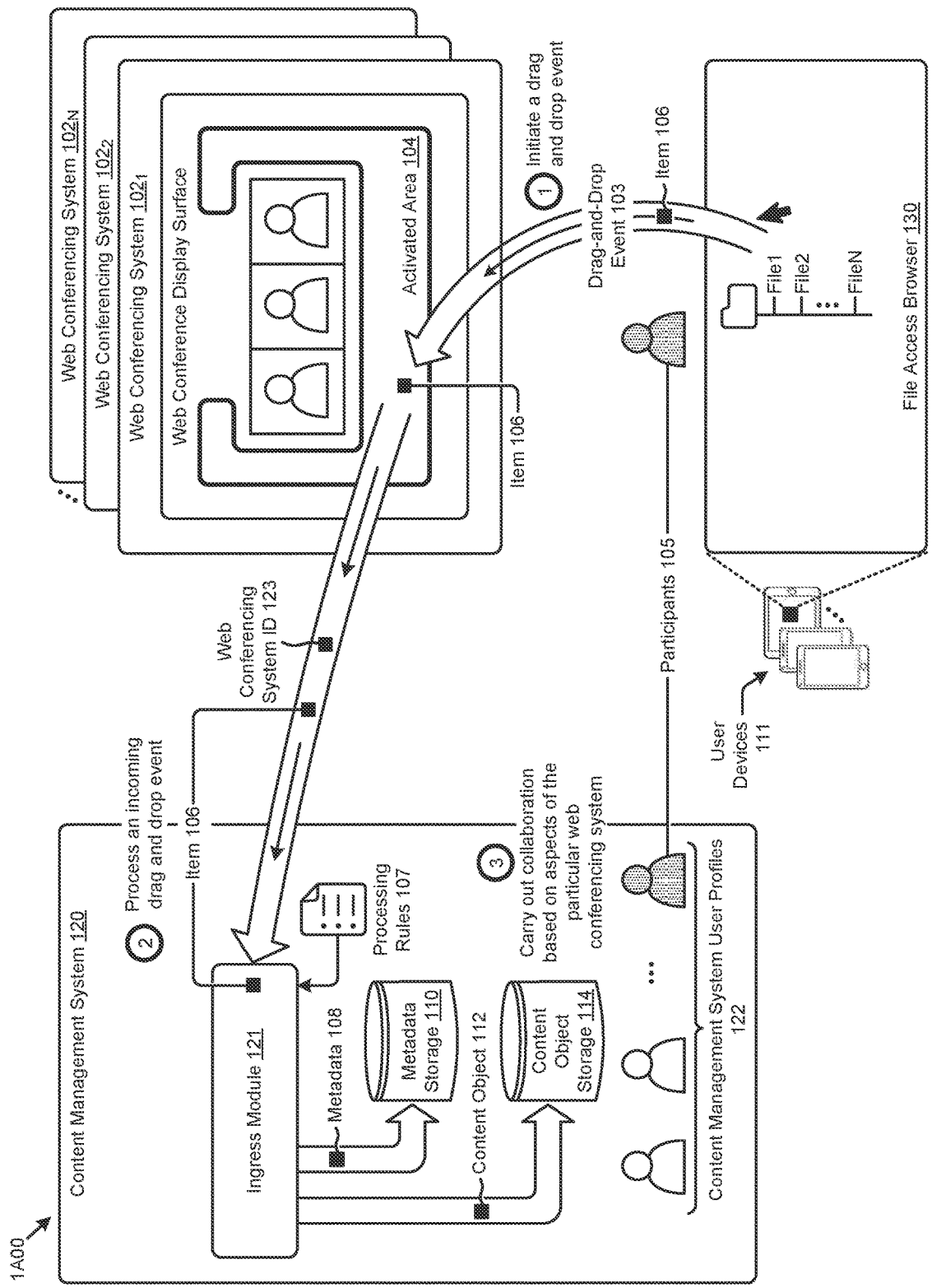
FIG. 1A exemplifies an environment in which a platform-agnostic drag-and-drop system can be implemented.

Aspects of the present disclosure solve problems associated with using computer systems for supporting drag-and-drop operations for a wide range of web conferencing systems. These problems are unique to computer-implemented web conferencing systems and/or content management systems. Some embodiments are directed to approaches for processing drag-and-drop events based on characteristics of a particular web conferencing system. The accompanying figures and discussions herein present example environments, systems, methods, and computer program products for handling web conferencing system upload events in a content management system.

Overview

Computer code is provided to implement platform-agnostic drag-and-drop operations. Specifically, computer code at a content management system operated by a first party is configured to receive a drag-and-drop event from a web conferencing system that is operated by a different party, where the event corresponding to the drag-and-drop event is raised during the course of a web conferencing session.

The content management system creates a file/folder hierarchy in an on-the-fly mode, and stores a content object corresponding to the drag-and-drop event in response to determining characteristics of the web conferencing session. In addition to storing the content object in a hierarchy of the content management system, the content management system also stores metadata pertaining to the content object. The particular metadata is determined based on characteristics of the web conferencing system and, moreover, the particular metadata is determined based on characteristics of the drag-and-drop action raised at the web conferencing system. The determination of characteristics of the web conferencing system can be based on a web conferencing system identity that uniquely distinguishes a particular web conferencing system from a plurality of alternative web conferencing facilities. As such, this provides one aspect of a platform-agnostic drag-and-drop capability.

Many platform-specific capabilities can be implemented by the content management system in addition to the aforementioned platform-agnostic capabilities. As one example, a content object corresponding to a particular drag-and-drop action is stored in the content management system in a hierarchy based at least in part on rules that correspond to a particular web conferencing system. A collaboration regime can be established based on the drag-and-drop action from a particular web conferencing system. For example, a particular content object corresponding to a particular drag-and-drop action from a particular web conferencing system can be stored in the content management system with a set of permissions that are, at least in part, based on the particular web conferencing system and/or based on a particular session of the web conferencing system. In some embodiments, in addition to, or as an alternative, the context or contexts of a particular session of the web conference (e.g., channels, shares, breakouts, etc.) can be retrieved from or derived from information of the web conferencing system, and then stored in the content management system. Strictly as examples, the foregoing context or contexts of a particular session of the web conference may include properties and/or other information of any number of conference participants.

In some embodiments, in addition to storing the content object in the content management system with a set of permissions, permissions can be granted such that participants of the web conferencing system can collaborate over the content object that is stored in the content management system. Such permissions may be persistent in the sense that once an identity and other information of any number of web conference participants is known at the content management system, the permissions assigned to the corresponding web conference participants can be durable, and possibly durable to the extent that the permissions assigned to the corresponding web conference participants can span through time across a series of sessions. As an alternative, permissions assigned to the corresponding web conference participants may be ephemeral in the sense that the permissions granted to participants of the web conferencing system are limited to only the timeframe that overlaps the particular web conference session. In some cases, the permissions may be ephemeral in the sense that the permissions granted to participants of the web conferencing system are limited to a specific timeframe during which participants of a particular web conference session can establish a user account at the content management system.

The foregoing collaboration regime can be implemented by enforcing various collaboration object handling techniques. A plurality of possible collaboration object handling techniques (e.g., how to handle a drag-and-drop event and/or a drag-and-dropped item) can be determined based on applying one or more of a plurality of rule sets, the rule sets being different based on a particular web conferencing system. In some cases, the web conferencing system ID and corresponding rule sets are used for determining one or more mechanisms that implement a particular collaboration regime.

In some embodiments, the mechanisms for communication between the content management system and the particular web conferencing system includes provision of integration code to be executed at the web conferencing system. Each web conferencing system may have different integration capabilities (e.g., different API capabilities and/or different plug-in capabilities) and, as such, the integration code can be provisioned based specific integration capabilities of a particular web conferencing system.

In some scenarios, after provisioning the integration code to be executed at the web conferencing system, the content management system may receive further events from or through the web conferencing system based on operation of the provisioned integration code. More specifically, the various processing actions to be taken based on the further events received from or through the web conferencing system may be determined based on the web conferencing system ID and/or other characteristics of the web conferencing system. In some cases, the integration code comprises at least a portion of a virtual file system. In some cases the integration code comprises a virtual file system previewer that is used to facilitate viewing and manipulation of a content object of the virtual file system. The content management system is able to process user events raised at or through the web conferencing system based on user actions taken over the content object using the integration code that is executing at the web conferencing system.

Definitions and Use of Figures

Some of the terms used in this description are defined below for easy reference. The presented terms and their respective definitions are not rigidly restricted to these definitions-a term may be further defined by the term's use within this disclosure. The term "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application and the appended claims, the term "or" is intended to mean an inclusive "or" rather than an exclusive "or". That is, unless specified otherwise, or is clear from the context, "X employs A or B" is intended to mean any of the natural inclusive permutations. That is, if X employs A, X employs B, or X employs both A and B, then "X employs A or B" is satisfied under any of the foregoing instances. As used herein, at least one of A or B means at least one of A, or at least one of B, or at least one of both A and B. In other words, this phrase is disjunctive. The articles "a" and "an" as used in this application and the appended claims should generally be construed to mean "one or more" unless specified otherwise or is clear from the context to be directed to a singular form.

Various embodiments are described herein with reference to the figures. It should be noted that the figures are not necessarily drawn to scale, and that elements of similar structures or functions are sometimes represented by like reference characters throughout the figures. It should also be noted that the figures are only intended to facilitate the description of the disclosed embodiments-they are not representative of an exhaustive treatment of all possible embodiments, and they are not intended to impute any limitation as to the scope of the claims. In addition, an illustrated embodiment need not portray all aspects or advantages of usage in any particular environment.

An aspect or an advantage described in conjunction with a particular embodiment is not necessarily limited to that embodiment and can be practiced in any other embodiments even if not so illustrated. References throughout this specification to "some embodiments" or "other embodiments" refer to a particular feature, structure, material, or characteristic described in connection with the embodiments as being included in at least one embodiment. Thus, the appearance of the phrases "in some embodiments" or "in other embodiments" in various places throughout this specification are not necessarily referring to the same embodiment or embodiments. The disclosed embodiments are not intended to be limiting of the claims.

Descriptions of Example Embodiments

FIG. 1A exemplifies an environment 1A00 in which a platform-agnostic drag-and-drop system can be implemented. The figure shows how an item (e.g., file or folder) that originates from a user device can be (1) dragged onto an activated area of a web conferencing system display surface, and then (2) processed in a content management system. More particularly, the figure shows how a user can initiate a drag-and-drop event 103 (operation 1) that corresponds to an item 106 that originates from any one of a variety of user devices 111. Still more particularly, the figure shows how a drag-and-drop event 103 into an activated area 104 of a web conferencing system display surface raises a user interface event that is communicated to (e.g., over the Internet), and processed by content management system 120 (operation 2).

In this particular embodiment, the event that is communicated to the content management system includes a web conferencing system ID 123. As such, the content management system can use the web conferencing system ID to identify the web conferencing system that corresponds to the drag-and-drop event. As shown, the drag-and-drop event is raised from one particular web conferencing system (i.e., the shown web conferencing system $102_1$), however there may be many alternative Internet-connected web conferencing facilities (e.g., web conferencing system $102_2$, web conferencing system $102_N$). The web conferencing system ID serves to uniquely distinguish a particular web conferencing system from a plurality of alternative web conferencing facilities.

At least inasmuch as there may be many alternative Internet-connected web conferencing facilities (e.g., web conferencing system $102_2$, web conferencing system $102_N$), there may be many different sets of processing rules 107 that can be identified based on web conferencing system ID 123 and/or based on other aspects of a particular web conferencing system. Such aspects can include a name or a domain name or an authentication certificate, etc., and moreover the processing rules may relate uniquely to (e.g., in a one-to-one correspondence) a particular one of many alternative Internet-connected web conferencing facilities.

The foregoing drag-and-drop event may be caused by any one of many participants 105, some of which participants may be merely a participant in a web conferencing session, or some of which participants may correspond to a person who has a corresponding user profile from among a group of content management system user profiles 122. In some situations, many drag-and-drop events may be caused contemporaneously by different participants. Each such event may be distinguished from any other contemporaneously raised event, at least by noticing the contents of a message that is sent from the web conferencing system to the content management system.

As shown, an ingress module 121 of the content management system receives an indication (e.g., a message) corresponding to an occurrence of a drag-and-drop event that had occurred at a particular web conferencing system. The ingress module can process the incoming item based on a selected set of processing rules 107, which selected set of processing rules can be determined based on the incoming web conferencing system ID and/or based on aspects of the incoming item, and/or based on any aspect or aspects of the web conferencing system that raised the event.

In some cases, processing of the incoming item may include augmenting the incoming item to comport the incoming item with a collaboration regime of the content management system so as to generate content object 112 that is stored in content object storage 114. In some cases, processing of the incoming item may include augmenting the incoming item with metadata 108 that is in turn stored in association with the content object, possibly in the same content object storage 114, or possibly in a separate metadata storage 110.

Now, returning to the initiation of the drag-and-drop event (operation 1), the drag-and-drop event may include an item that originated from a user device of a participant in the web conference session. More particularly, and as shown, although the item may be stored in the user device (e.g., in a non-volatile storage device), the actual drag-and-drop event is facilitated by a user interface of the user device. Such a user interface of the user device (e.g., a file access browser 130) may display a folder and constituent contents (e.g., file1, file2, . . . , fileN, as shown). The constituent contents can be any sort of object (e.g., a text file, an image, a sound/movie file, etc.) that the invoking participant wants to share with the other participants. The content management system can detect the type of object or objects that the invoking participant wants to share with the other participants and, moreover, the content management system can process the object or objects in a manner that facilitates collaboration over the object or objects (operation 3). In this embodiment, and in many other cases, collaboration over the object or objects can extend beyond merely sharing the object or objects and/or its contents in the context of a display screen during the progression of the web conference session. Various such content object sharing techniques, many of which depend on characteristics of a particular web conferencing system can be carried out during the progression of the web conference session. As can now be understood, since a content object corresponding to the drag-and-dropped item is stored in the content management system, content object sharing and active collaboration can continue even after the web conference session has ended. Some such examples of content object sharing are shown and described as pertains to FIG. 1B.

Figure 1B:
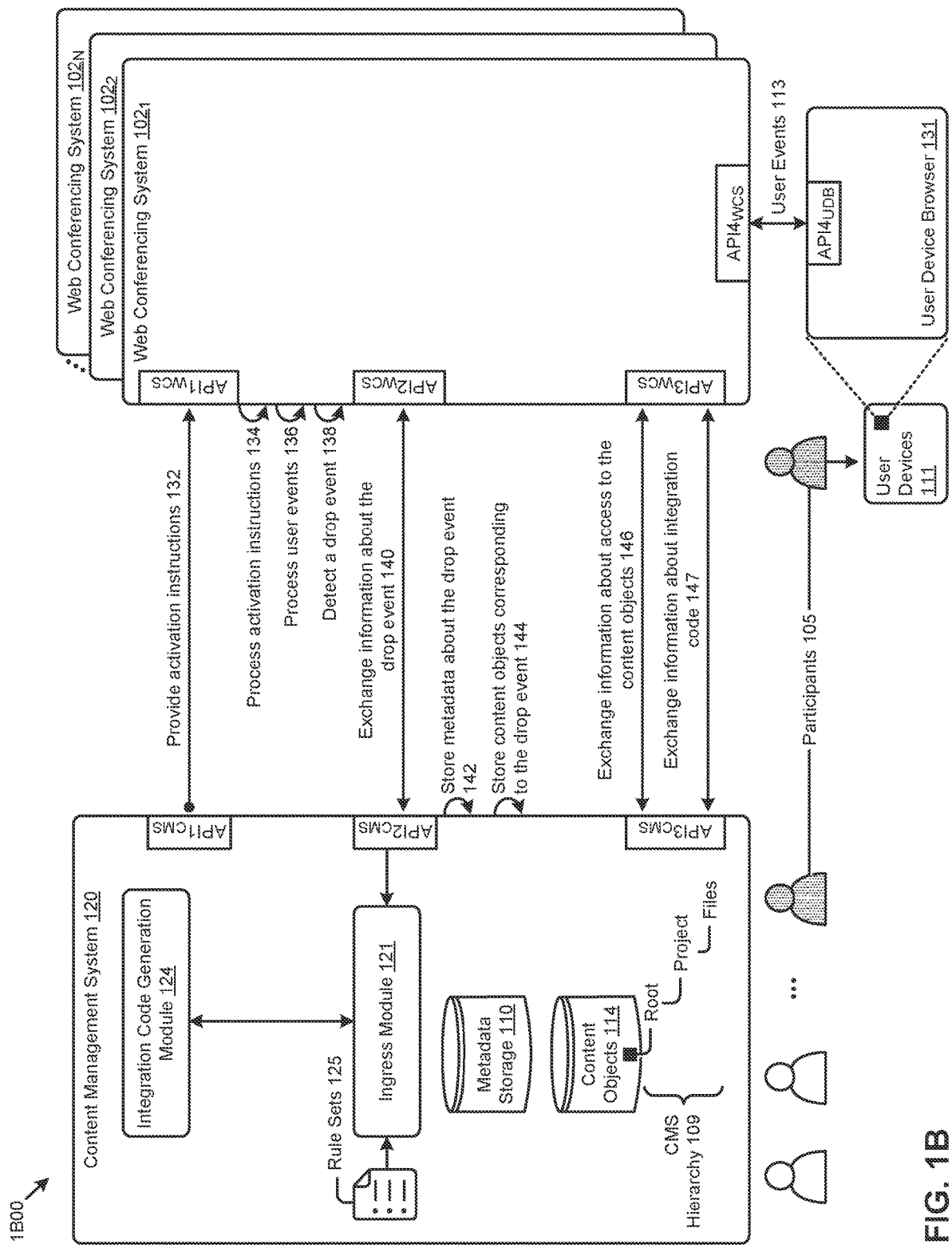
FIG. 1B exemplifies techniques for sharing a content object with web conferencing system participants, according to an embodiment.

FIG. 1B exemplifies an integration option for sharing a content object with web conference participants. One or more variations of integration 1B00 or any aspect thereof may be implemented in the context of the architecture and functionality of the embodiments described herein and/or in any environment.

The figure shows how a computing element of a first entity (e.g., a vendor of a content management system) can integrate with a computing element of a second entity (e.g., a vendor of a web conferencing system) through application programming interfaces (APIs) and/or by operation of integration code. More specifically, the figure shows how a first pair of APIs (e.g., $API1_{CMS}$ and $API1_{WCS}$) can be used by the content management system 120 and a particular web conferencing system (e.g., web conferencing system $102_1$) to activate a one or more areas of a display area of the web conferencing system. In this specific embodiment, the content management system provides activation instructions (e.g., in inter-vendor communication 132) to the web conferencing system. The web conferencing system in turn will activate a display area such that a drop event that involves the activated area will raise a notification of the event to the content management system. Strictly as one example, and as shown, the web conferencing system can process the received activation instructions (e.g., in operation 134) such that the activated display area is responsive to user events. In some situations, the web conferencing system can itself determine characteristics of an activated display area. Furthermore, the web conferencing system can itself manage any number of activated display areas. In some situations, $API1_{CMS}$ and $API1_{WCS}$ or alternative APIs can be used to advise the content management system of the characteristics of any one or more activated display areas. Still further, in some situations, when a web conferencing system notifies the content management system of an occurrence of a drop event, that notification may include information pertaining to the specific activated display area (e.g., was the specific activated display area a "chat" area, or was the specific activated display area a "navigation panel" area, etc.).

In this example embodiment, upon occurrence of a user event that involves the activated area, the web conferencing system can process such a user event (e.g., as depicted by operation 136) and, in the situation that the user event is a drop event (e.g., as determined by operation 138), then the web conferencing system and the content management system communicate (e.g., over $API2_{CMS}$ and $API2_{WCS}$) to exchange information about the drop event (inter-vendor communication 140). Upon receipt of an indication of an occurrence of a drop event at the web conferencing system (e.g., based on information in inter-vendor communication 140), the content management system invokes an instance of ingress module 121, which in turn will access the rule sets 125. One or more ingress rules from rule sets 125 may be used to invoke and configure an integration code generation module 124, and one or more ingress rules from rule sets 125 may be used to form and store metadata (e.g., via operation 142) pertaining to the drop event. Further, one or more ingress rules from rule sets 125 may be used to form a content management system hierarchy (e.g., CMS hierarchy 109), which defines or influences where the item corresponding to the drop event is to be stored (operation 144). As shown, such a hierarchy may be based on or derived from information from the web conferencing system. More particularly, a given web conferencing system may have an inherent hierarchical information model from which an on-the-fly folder hierarchy creation technique can be based. Various on-the-fly folder hierarchy creation techniques are shown and described as pertains to FIG. 1D.

Continuing the discussion of this embodiment, further APIs (e.g., $API3_{CMS}$ and $API3_{WCS}$) are used to exchange information about access to the item corresponding to the drop event (e.g., via inter-vendor communication 146). As such, and given information about access to the item corresponding to the drop event, the content management can retrieve the item. In some cases, a copy of the item is retrieved, whereas in some cases, merely a reference to the item is retrieved. A reference to the item can be, as nonlimiting examples, a uniform resource identifier (URI), or a uniform resource locator (URL), or any other identifier that can be used to directly or indirectly access the item. In some cases, the content management system and the web conferencing system are configured such that the content management system is able to retrieve the item corresponding to the drop event directly from the source of the dropped item. In some cases, the content management system and the web conferencing system are configured such that the content management system is able to retrieve the item corresponding to the drop event by accessing a pass-through copy of the item that is made accessible to the content management system by the web conferencing system. In some cases, the item corresponding to the drop event is identified by a URI or URL that identifies or locates the item at a web-enabled storage location (e.g., an online file repository, and online storage and retrieval facility, etc.)

In some cases, and as depicted in the embodiment, an integration code module is provided (inter-vendor communication 147) by the content management system to the web conferencing system for execution by the web conferencing system. The act of executing the integration code module in the web conferencing system serves to provide collaboration capabilities over the item beyond merely sharing the item and/or its contents in the context of a display screen that is shared during the progression of a web conference session.

In some cases, integration code module includes the definition of, and/or code for, additional capabilities by and between the web conferencing system and a user device. In the example shown, the definition of, and/or code for, an API pair (e.g., $API4_{UDB}$ and $API4_{WCS}$) is such that additional user events 113 can be raised by the user device browser 131 and interpreted by the web conferencing system. In some cases, one or more of the user devices can accept integration code that adds content management system functionality to the user devices. In some cases, the user devices of all participants of a particular web conferencing session can receive and optionally install such integration code. As such, and in particular, when the integration code provides access credentials to access content objects of the content management system, any/all of the participants of a particular web conferencing session can access items that are stored in the content management system, which access can be permitted even after the web conference session has ended.

The determination of whether or not a particular web conferencing system can accept integration code, and/or the determination of how to generate and configure integration code, and/or the determination of other aspects of processing events received from a web conferencing system can be based on platform-specific rules. In this manner, the content management system can integrate with, and can process events from, any arbitrary web conferencing system.

Figure 1C:
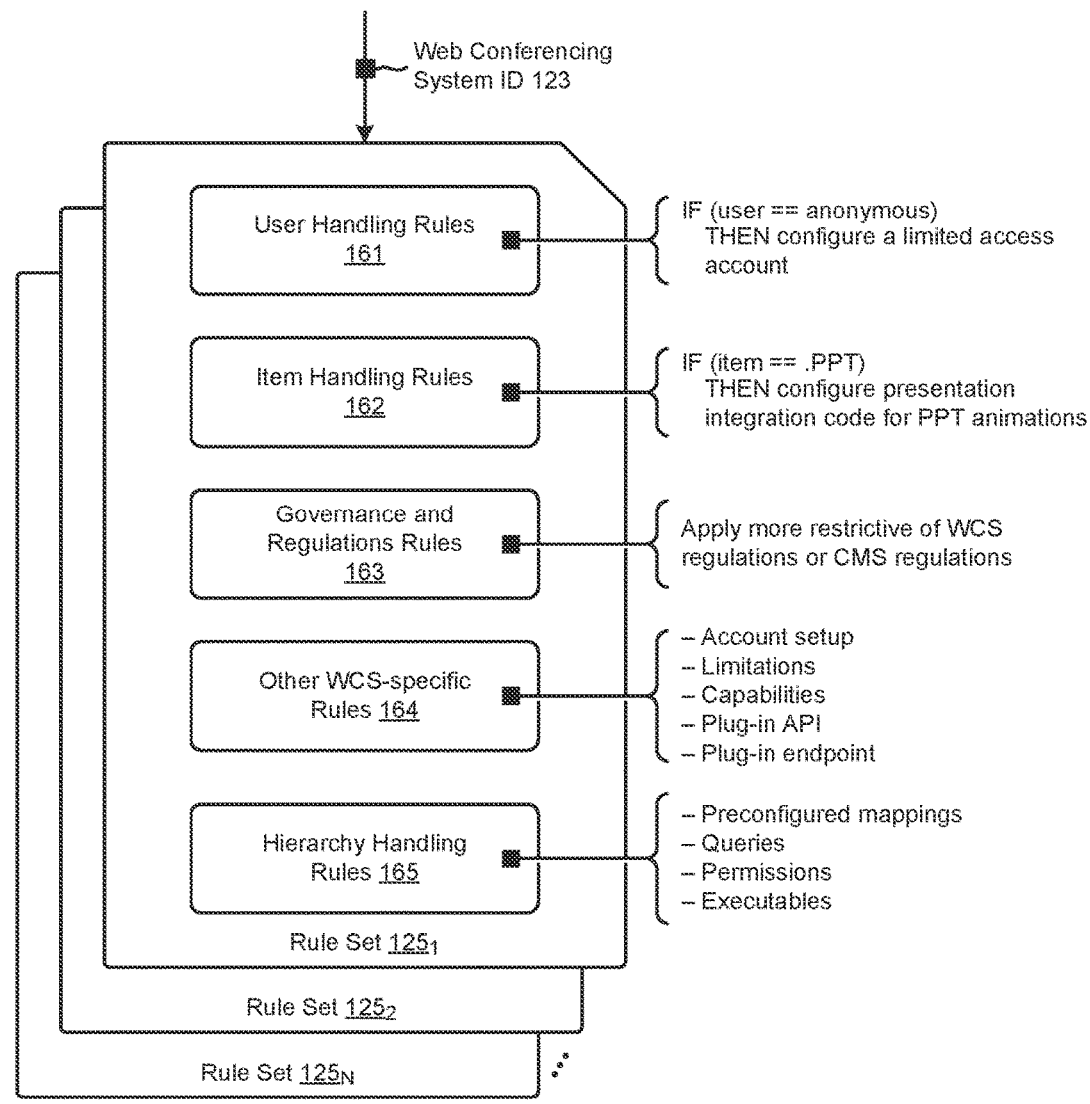
FIG. 1C exemplifies independent sets of platform-specific rules for processing events received from an arbitrary web conferencing system, according to an embodiment.

FIG. 1C exemplifies independent sets of platform-specific rules for processing events received from an arbitrary web conferencing system. As an option, one or more variations of platform-specific rules 1C00 or any aspect thereof may be implemented in the context of the architecture and functionality of the embodiments described herein and/or in any environment.

As shown, an incoming web conferencing system ID 123 can be used to select one particular rule set (e.g., rule set $125_1$) from a plurality of rule sets (rule set $125_2$, ..., rule set $125_N$). Any rule set may include any number or sets of processing options. A rule set may include any combination of user handling rules 161, item handling rules 162, governance and regulations rules 163, hierarchy handling rules 165, and/or other WCS-specific rules 164.

In some cases, and as shown, user handling rules 161 include provisions for on-the-fly creation of a limited access account that provides access to features of the content management system even when the user (e.g., the participant that raised the drag-and-drop event) is not known within the content management system (i.e., is an anonymous' user with respect to the content management system). In some cases, item handling rules can be used to direct an integration code generation module (e.g., the integration code generation module 124 of FIG. 1B) to configure a preview capability based on the incoming item.

In some cases, and as shown, hierarchy handling rules 165 include provisions for on-the-fly creation of a hierarchy at the content management system. Such rules may comprise one or more preconfigured mappings, and/or queries to direct to the web conferencing system, and/or the rules may comprise one or more permissions to apply to locations in, and/or constituents of, the hierarchy. In some cases, the hierarchy handling rules 165 include one or more references to executable modules that can be invoked at and by the content management system based on aspects of the incoming event and/or based on aspects of the web conferencing system itself so as to implement on-the-fly folder hierarchy creation.

In some cases, other WCS-specific rules 164 include provisions for geo-specific rules that derived from specific political or jurisdictional boundaries. For example, WCS-specific rules 164 might encompass sharing limitations that apply to sharing or other handling of documents that are sensitive and are intended to be limited to sharing only within a particular geo-specific or country-specific or jurisdiction-specific boundary. A potential sharing violation can be detected prior to dissemination of a content object beyond a particular geo-specific or country-specific or jurisdiction-specific boundary.

Figure 1D:
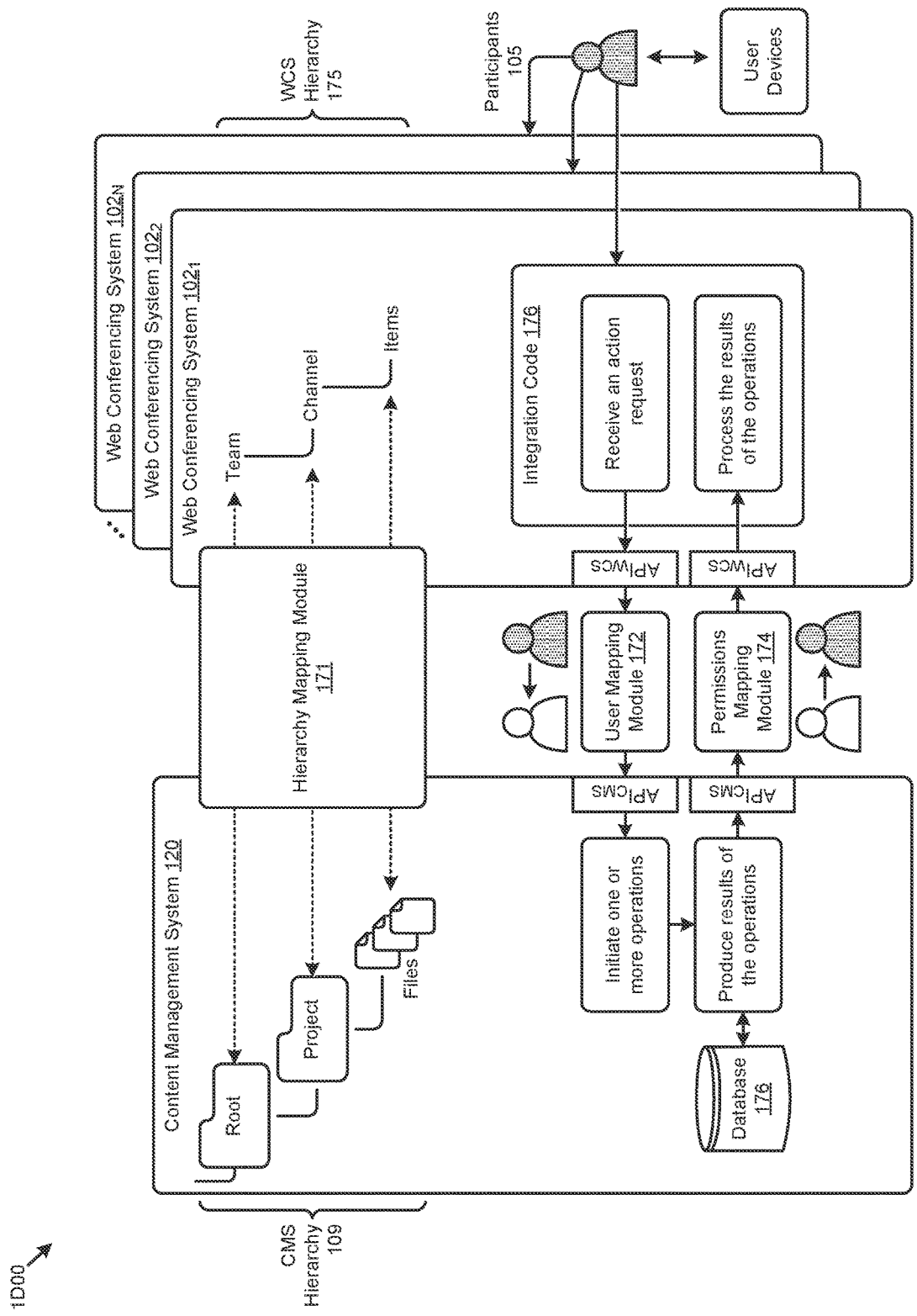
FIG. 1D exemplifies an on-the-fly folder hierarchy creation technique as used when mapping a web conferencing system upload event into a collaboration regime of a content management system, according to an embodiment.

FIG. 1D exemplifies an on-the-fly folder hierarchy creation technique as used when mapping a web conferencing system upload event into a collaboration regime of a content management system. As an option, one or more variations of on-the-fly folder hierarchy creation technique 1D00 or any aspect thereof may be implemented in the context of the architecture and functionality of the embodiments described herein and/or in any environment.

The shown hierarchy generation technique can be employed whenever there is a hierarchy in the web conferencing system that can correspond to a hierarchy in the content management system (e.g., the shown CMS hierarchy 109). As such, the implementation of FIG. 1D is merely an example implementation and many alternatives or variations are possible. In the shown implementation, a hierarchy of the web conferencing system is identified (e.g., WCS hierarchy 175). Aspects of the identified WCS hierarchy are mapped to a hierarchy of objects in the content management system.

A hierarchy of the web conferencing system can be determined in whole or in part using any known means. Strictly as one example, the hierarchy of the web conferencing system can be defined by a table, or by a series of parenthesized or delimiter-separated hierarchical elements, or the hierarchy of the web conferencing system can be codified in Java or JSON, etc. The thusly-defined hierarchy of the web conferencing system can drive a mapping algorithm to map from aspects of the hierarchy of the web conferencing system to objects of the content management system. In some cases, a particular mapping algorithm is selected based on the specific web conferencing system of interest. In some cases, a particular mapping algorithm is selected based on the then-current configuration of the specific web conferencing system of interest. In some cases, a particular mapping algorithm is selected based on the then-current parameters of a then-current session of the specific web conferencing system of interest. In some cases, a "Team" and/or a "Channel" of the web conferencing system is mapped to a project folder the content management system and an item such as a document, or discussion thread, or comment thread, or event, etc. is mapped to a file in the content management system.

In some cases, a particular web conferencing system has an implied hierarchy built into its use model. Strictly as an example, a top level of a web conferencing system hierarchy might correspond to the participants of the web conference session, whereas a second level of the web conferencing hierarchy might correspond to a particular share (e.g., shared desktop, shared application, shared whiteboard, etc.), whereas a third level of the web conferencing hierarchy might correspond to particular events or types of events that are raised during the presentation of the share to the participants (e.g., an annotation on the shared desktop, chat contents that were raised while the shared application was the active share, security settings that were changed while the shared whiteboard was the active share, etc.). Any of the foregoing mapping techniques, whether employed singly or in combination can be implemented by an instance of the shown hierarchy mapping module 171. As shown, the hierarchy mapping module 171 can be deployed in any convenient location. More specifically, and as shown, the hierarchy mapping module 171 can be implemented in a location that is only partially inside of the content management system and only partially inside of a particular web conferencing system. In some cases, the hierarchy mapping module 171 can be implemented in a location that is partially inside of the content management system, partially inside of a particular web conferencing system, and partially inside of a user device.

In some cases, the web conferencing system is a messaging facility (e.g., "Slack", "Wire", "Pronto", "Flock", etc.), which facility has an implied hierarchy built into its use model. For example, a "Department" may have one or more "Channels," and each channel might have "Subscribers."

In some cases, a web conferencing system is a web conferencing application that includes a native messaging facility (e.g., a chat facility). In such cases, the occurrences of messaging events (e.g., sending some text to another participant, or broadcasting a URL to all participants, etc.) can be timestamped by the web conferencing application in a manner that relates the timestamped event to the then-current web conferencing share. For example, at the moment that "Desktop A" is being shared by "User A," it can happen that "User B" sends chat content. Since the moment that "Desktop A" is being shared by "User A" can be timestamped, and since the moment that "User B" sends chat content to the participants can also be timestamped, those two different events can be inter-related, at least by the specific time indicated in the timestamp.

The hierarchy of web conferencing system being thusly defined and mapped to a corresponding hierarchy of the content management system can be used to form a hierarchy of storage locations in the content management system. Any one or more of the storage locations and/or constituent content objects of the content management system can take on a particular set of storage location permissions. In some cases, constituents of the storage location hierarchy can initially take on storage location permissions that are derived from a particular user. In some cases, constituents of the storage location hierarchy can initially take on storage location that are derived from a particular channel.

Any of the foregoing initial sets of access permissions and/or subsequently applied permission can be overwritten. More particularly, access permissions applied to the storage location hierarchy can be updated based on aspects of a series of events or even a single web conferencing system event. Additionally or alternatively, access permissions applied to the storage location hierarchy can be updated based on aspects of the users of the web conferencing system. As specific examples: (1) access permissions applied to the storage location hierarchy can be updated based on an addition of a user at the web conferencing system, and/or (2) access permissions applied to the storage location hierarchy can be updated based on a deletion of a user at the web conferencing system, and/or (3) access permissions applied to the storage location hierarchy can be updated based on a security setting change that occurs at the web conferencing system.

Any of the foregoing examples of updating a permission can be handled by code that operates within the CMS either solely, or in conjunction with, integration code 176 that operates within the web conferencing system. The integration code might execute as a user mapping module 172 that is logically situated to interface between the CMS and the WCS. Additionally, or alternatively, the integration code might execute as permissions mapping module 174 that is logically situated to interface between the CMS and the WCS. Additionally, or alternatively, the integration code might interface with one or more instances of $API_{WCS}$, which in turn interfaces with more instances of $API_{CMS}$.

Figure 1E:
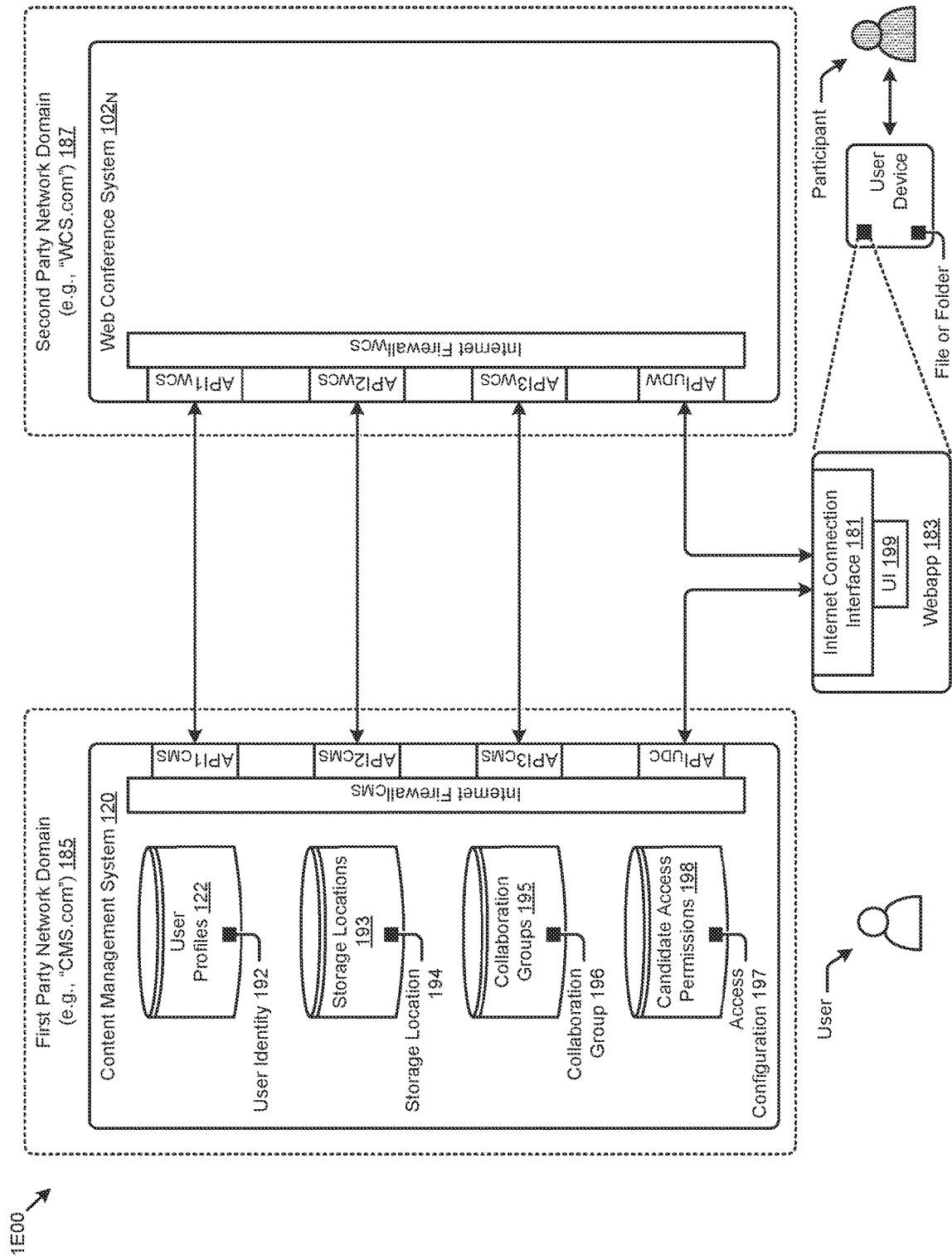
FIG. 1E exemplifies a multi-party Internet communications ecosystem, according to an embodiment.

FIG. 1E exemplifies a multi-party Internet communications ecosystem. The communication facilities can be used for mapping events at a web conferencing system in a first Internet domain to into actions taken at a content management system in a second Internet domain and vice-versa. As an option, one or more variations of multi-party Internet communications ecosystem 1E00 or any aspect thereof may be implemented in the context of the architecture and functionality of the embodiments described herein.

As shown, content management system 120 and web conferencing system $102_N$ are situated in separate Internet domains, where each separate domain includes a domain-specific firewall (e.g., Internet $firewall_{CMS}$, and Internet $firewall_{WCS}$). The content management system and the web conferencing system communicate securely over Internet 180. More particularly, any number of servlets can be invoked via endpoints that are accessed by a URI. This is shown by APIs (e.g., $API1_{CMS}$, $API1_{WCS}$, $API2_{CMS}$, $API2_{WCS}$, $API3_{CMS}$, $API3_{WCS}$, etc.). Any API in the second party network domain 187 can be accessed from the first party network domain 185 over Internet 180. Moreover, a user device can include a webapp 183 that has an Internet connection interface 181 to a plurality of APIs (e.g., $API_{UDC}$, $API_{UDW}$). First portions of the webapp can be provided by the first party (e.g., from integration code hosted within the first party network domain). Second portions of the webapp can be provided by the second party (e.g., from integration code hosted within the second party network domain). The foregoing first portions and second portions of webapp 183 can operate independent from each other. Alternatively, the foregoing first portions and second portions of webapp 183 can operate in cooperation with each other.

In additional or alternative implementations, messages can be formed within the web conferencing system and sent to the content management system over the Internet. In the other direction, messages can be formed within the content management system and sent to the web conferencing system over the Internet.

The herein-disclosed embodiments for defining and deploying a scalable infrastructure that facilitates rapid bring-up of multi-party integrations involve technological solutions pertaining to technological problems that arise in the hardware and software arts that underlie collaboration systems. Aspects of the present disclosure achieve performance and other improvements in peripheral technical fields including, but not limited to, Internet-based web services and Internet communications between multiple third-party apps and a content management system.

A group of users can form a collaboration group, and a collaboration group can be composed of any types or roles of users. For example, and as shown, a collaboration group can comprise a user collaborator, an administrator collaborator, a creator collaborator, etc. Any user can use any one or more of the access devices, and such access devices can be operated concurrently to provide multiple concurrent sessions.

Strictly as examples, any of the foregoing sessions may include web conference sessions and/or collaboration sessions that involve accessing (e.g., using, administrating, creating, etc.) files or folders of the content management system.

For purposes of illustration, the figure shows merely one web conferencing system, however any number of web conferencing systems can be present in this ecosystem. Moreover, for at least the reason of providing a platform-agnostic drag-and-drop capability, multiple different web conferencing systems can be present in the ecosystem. The content management system can detect the origin of any drag-and-drop event via characteristics of an incoming message, and/or the content management system can detect the origin of any drag-and-drop event merely by occurrence of an invocation of a servlet through a specific endpoint or API.

Variations of multi-party Internet communications ecosystem 1E00 can be deployed to be able to carry out a protocol, which protocol implements a method for processing events between the web conferencing system and the content management system. In one scenario, and as shown, (1) the web conferencing system is provided by a first party that provides a web conferencing system that implements a first computing system in a first network domain (e.g., WCS.com), and (2) the content management system is provided by a second party that provides collaboration tools in the context of a content management system that is implemented by a second computing system in a second network domain that is different from the first network domain.

During the course of carrying out the foregoing protocol, the content management system receives a network communication pertaining to a user interface event raised from a UI (e.g., UI 199) of a user device that is Internet-connected to the first network domain. Specifically, the network communication from the first network domain is sent to the second network domain when a user interface of the web conferencing system is used by one or more participants of a web conference session to bring a file or folder into the web conference session of the web conferencing system.

In response to receiving the network communication from the first network domain, the two systems cooperate between themselves to make the file or folder available in a collaboration form (e.g., not just as an image formed of pixels from a display screen) to the one or more participants of the web conference session. In this scenario, the file or folder is made available to the one or more participants of the web conference session by: (1) analyzing the network communication from the first network domain to determine an identity of a user of the content management system into whose account the file or folder is to be stored in a location accessible by the user, and analyzing the network communication from the first network domain to determine an identification of an item that corresponds to the file or folder to be stored in the location accessible by the user; (2) in response to determining the identity of the user of the content management system (e.g., via user identity 192), then accessing data storage of the content management system to identify one or more collaboration groups 195 associated with the identified user, and to identify a storage location 194 for the file or folder; prior to (3) storing the file or folder into the identified storage location (e.g., identified from a range of storage locations 193) and configuring the file or folder, and/or its storage locations, to allow access to the file or folder by one or more participants of the web conference session.

The method may further comprise applying storage location permissions (e.g., candidate access permissions 198) derived from information pertaining to at least one collaboration group 196 associated with the user and/or the method may further comprise modifying the storage location permissions (e.g., via an access configuration 197) to make the file or folder available to participants of the web conference session for a limited duration after the web conference session has ended.

Figure 2:
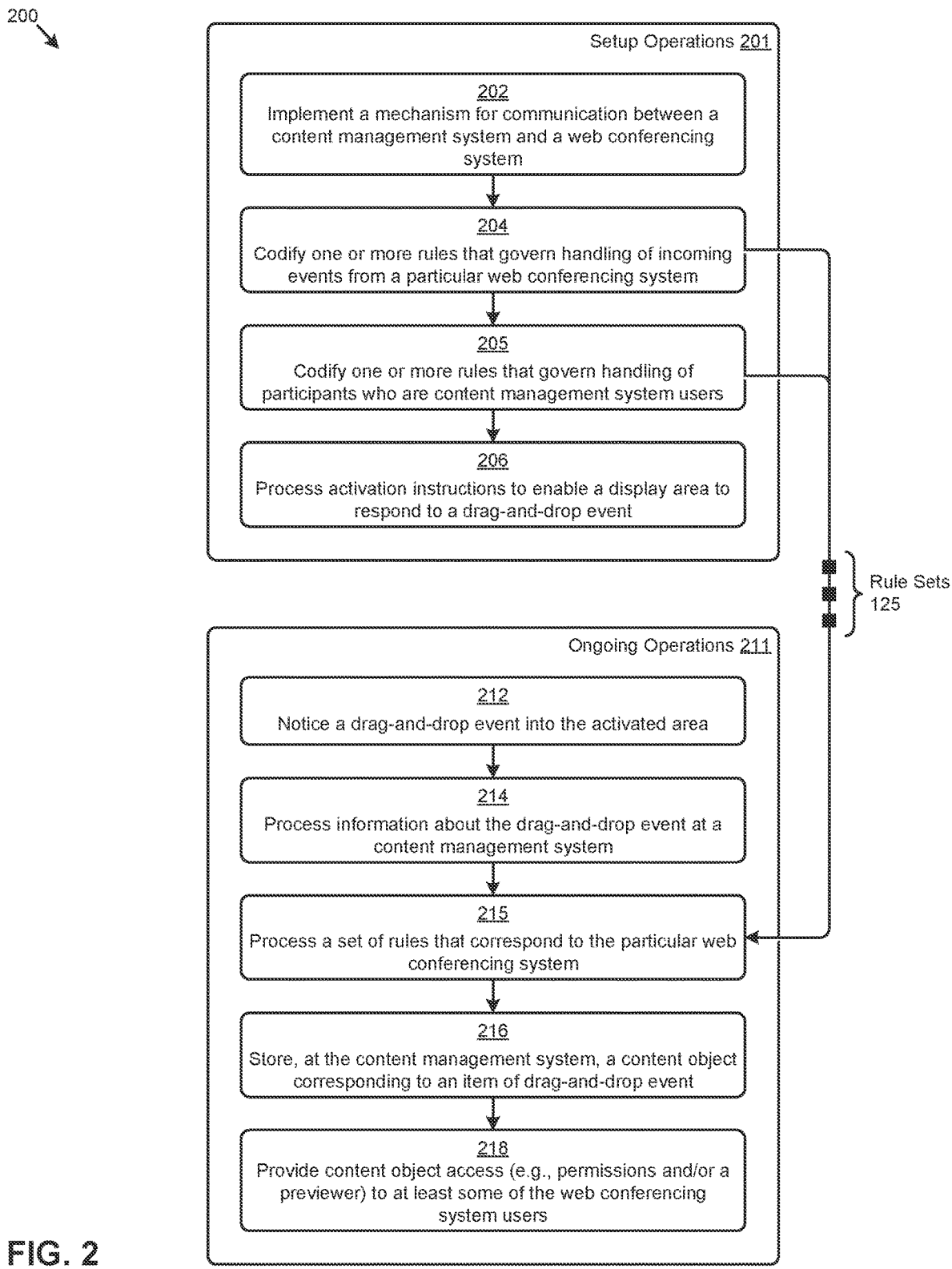
FIG. 2 depicts a processing flow that implements platform-agnostic drag-and-drop operations by and between a content management system and a web conferencing system, according to an embodiment.

Mechanisms for setting up the systems so as to be configured to carry out the foregoing inter-party protocol are shown and described as pertains to FIG. 2.

FIG. 2 depicts a processing flow that implements platform-agnostic drag-and-drop operations by and between a content management system and a web conferencing system. As an option, one or more variations of processing flow 200 or any aspect thereof may be implemented in the context of the architecture and functionality of the embodiments described herein and/or in any environment.

As shown, the processing flow includes a first flow of setup operations 201 and a second flow of ongoing operations 211. In most implementations, some or all of the setup operations are carried out before any of the ongoing operations are initiated. Often, the vendor of the content management system and the vendor of the web conferencing system agree on aspects of integration between them. Then, at least some of the setup operations can commence. As an example, the two parties (e.g., the vendor of the content management system and the vendor of the web conferencing system) can decide to implement web APIs that can be operated between their respective web domains. Additionally, the two parties can decide to send/receive integration code that can be operated between their respective web domains. More particularly, the first party (e.g., the vendor of the content management system) can agree to generate integration code that comports with the architecture and configuration of the computing elements of the web conferencing system. Similarly, the second party (e.g., the vendor of the web conferencing system) can agree to consider the first party a trusted party and, as such, the second party would implement an authentication scheme as dictated by the first party. The two parties may agree to send/receive integration code over APIs that are agreed-to by the parties. Moreover, the two parties may agree on how to codify and interpret rules, and the two parties may agree on how to codify and interpret instructions pertaining to providing an activated area (e.g., the activated area 104 or FIG. 1). The form of any agreements on how to codify and interpret rules and/or instructions can be merely an agreement to use one or more standards (e.g., standard protocols). Alternatively, the agreements on how to codify and interpret rules and/or instructions can be proprietary as between the two parties.

Once at least some of the agreements have been reached, then, at step 202, the parties can implement the agreed-upon API mechanisms into their respective computing elements. Also, one or both parties can cooperate to codify rules (step 204) that govern handling of events (e.g., drag-and-drop events, drop events, copy-paste events, etc.). Furthermore, and at least since it is possible that a participant of a particular web conference session is not also a user of the content management system, then one or both parties can cooperate to codify rules (step 205) that govern handling of participants who are not also users of the content management system. In addition to technological considerations, there may be business considerations that are agreed-to by the parties.

During the course of carrying out the setup operations, a computing element of a first entity (e.g., a vendor of a content management system) communicates with a computing element of a second entity (e.g., a vendor of a web conferencing system) through application programming interfaces (APIs). Certain of the inter-party network communications that may be carried out during setup operations 201 are those inter-party network communications that serve to establish an activated area of a web conferencing system display surface (step 206). The particular activated area of a web conferencing system display surface can be initially established at a first time, and then changed in a subsequent inter-party communication at a second, later time.

Additionally or alternatively, the particular activated area of a web conferencing system display surface can be established based on events that occur in the web conferencing system. Strictly as one example, an initial activated area of a web conferencing system display surface might be provided to the host of the web conference session and then, if and when a host is added or changed, an additional activated area is provided, which additional activated area corresponds to the added or changed host. As another example, an additional web conferencing system display surface might be provided to a later joining participant of the host of the web conference. As such, additional inter-party network communications may serve to establish additional activated areas of the web conferencing system display surface that is added upon establishment of the later joining participant.

Any of the codified rules as heretofore-discussed can be stored in any location that can be accessed by a computer (e.g., in a database, in a file, in code, in memory, etc.). In the embodiment of FIG. 2, such codified rules (e.g., the shown rule sets 125) can be accessed by any of the ongoing operations 211. The particular sequence of operations that are given in the flow of ongoing operations 211 is merely for illustration. In some cases, the ongoing operations are implemented as individually- and independently-callable servlets and, as such, the order of execution can vary and/or overlap of execution of the operations can occur.

Now, with respect to the particular embodiment of FIG. 2, the ongoing operations commence when a drag-and-drop event is noticed (step 212). This can happen initially by the web conferencing system, and then, subsequently, notification of the occurrence of the event is communicated to the content management system. The content management system in turn will process (at step 214) various information about the noticed event. Such various information may derive from the notification itself, and/or from additional information that pertains to the event. Strictly as examples, additional information that pertains to the event may be provided by operation of an API, or additional information that pertains to the event may be provided by messaging by and between the web conferencing system and the content management system.

In response to the occurrence of the event, and with respect to the additional information that pertains to the event, the content management system will process the event (at step 214) in accordance with any one or more rules (at step 215) that correspond to the web conferencing system. In various embodiments, one or more items of information are stored (step 216) at the content management system. The one or more items of information may include storing the item that was the subject of the drag-and-drop event. For example, if a ".PPTX" presentation file had been the subject of the drag-and-drop event, then the content management system may process the presentation into a content object that comports with the collaboration regime of the content management system. More particularly, and again, strictly as an example, the presentation file might be processed to ensure the file is virus free, and/or the presentation file might be processed to locate and extract video clips, and/or the presentation file might be processed to identify any one or more topics, one or more authors, and/or one or more locations of personally-identifiable information, etc.

Once the incoming item that was the subject of the drag-and-drop event has been processed into a content object that comports with the collaboration regime of the content management system, the content object can be further shared, possibly by delivery of the content object and a corresponding preview to the users of the web conferencing system (step 218). One possible technique for delivery of the content object and delivery of its corresponding previewer to the users of the web conferencing system is shown and described as pertains to FIG. 3A.

FIG. 3A1 and FIG. 3A2 depict an example web conferencing system user interface as used to launch a previewer in response to a drag-and-drop event. As an option, one or more variations of web conferencing system user interface 3A00 or any aspect thereof may be implemented in the context of the architecture and functionality of the embodiments described herein and/or in any environment.

FIG. 3A1 depicts a drag-and-drop event of an item (e.g., "Item F1") that is dragged from a file access browser 130 of a user device into an activated area 104 of a web conferencing system display surface 301. The activated area is shown to the right of a navigation panel 360, however the activated area can include any portion or multiple portions of the web conferencing system display surface 301. In this particular example embodiment, the drop location of the drag-and-drop event is in the sharing panel; however, in other embodiments, the drop location of the drag-and-drop event might be on top of, or nearby to, a particular graphical element of the web conferencing system display surface 301. In this manner, context information about the drag-and-drop event can be captured and delivered to the content management system. Strictly as one illustrative example of the foregoing, if the drop location of the drag-and-drop event was in the navigation panel 360, and more specifically, if the drop location of the drag-and-drop event was on top of, or nearby to, the particular graphical element shown as selected context 370, then it can be known that the context of the drag-and-drop event was pertaining to "Marketing".

The occurrence of such a drag-and-drop event, together with the item of the drag-and-drop, and possibly also including contextual information, can be sent to a content management system. The content management system can respond by providing a content object corresponding to the item that was the subject of the drag-and-drop event. In some embodiments, and as shown in FIG. 3A2, the content management system can respond by providing a previewer that is configured to process commands over the content object. Such a previewer is shown in FIG. 3A2 as integration code widget 362. In this particular embodiment, the integration code widget 362 displays the content management system content object designation 364. Furthermore, and as shown, the integration code widget displays a preview button as well as other content management system action buttons 366. Activating (e.g., clicking) any of the buttons will cause the integration code widget to carry out operations corresponding to the activated button. In the case of a click on the "Preview" button, the integration code widget will display the content object and provide navigation controls. In some cases, a previewer operation invoked by one user (e.g., a previewer operation to navigate to a particular slide) might cause replication of that previewer operation to be communicated to other previewer instances of other participants such that the other previewer instances of the other participants have the option of corresponding to (e.g., tracking synchronously) the same previewer operation (e.g., to navigate to the particular slide).

Further details regarding general approaches to replication of previewer operations to other previewer instances are described in U.S. Pat. No. 10,742,434 issued on Aug. 11, 2020, which is hereby incorporated by reference in its entirety.

Additionally, or alternatively, any of the other previewer instances corresponding to the other participants have the option of navigating using their own previewer controls, irrespective of the previewer operations being performed by any other participants.

FIG. 3B1 and FIG. 3B2 depict example web conferencing system user interface variations. As an option, one or more variations of web conferencing system user interface variations 3B00 or any aspect thereof may be implemented in the context of the architecture and functionality of the embodiments described herein and/or in any environment.

FIG. 3B1 shows a web conferencing system display surface 301 having an activated area 104 within a navigation panel. The activated area is able to serve as a drop location from a "copy and paste" drop operation. As is known in the art, certain devices do not have a mouse device or other pointing device attached to or associated with them. Instead a finger is used in conjunction with a touch screen to emulate certain mouse-like operations such as dragging and dropping. In some situations, a finger and a touch screen can be used to emulate a drag-and-drop operation. Specifically, to emulate a drag-and-drop operation, a finger can first identify (e.g., select, copy) an item, and once so identified, the identified item can be dropped (e.g., pasted) into a different location. In this example, the item corresponding to "Item F1" is first identified (e.g., selected, highlighted) from the file access browser 130 and then dropped (e.g., pasted) into or onto a drop location (e.g., over "Channel99").

The foregoing is merely one implementation of a drag-and-drop operation. Other implementation may provide additional or alternative capabilities for a drag-and-drop operation. In some situations, an item (e.g., the foregoing "Item F1") can be a file, whereas in other situations the item can be a folder. In some situations, and as contemplated herein, a drag-and-drop operation on a folder carries the semantics of "drop the folder plus the contents of the folder plus any hierarchically lower folders and/or their contents to the drop location." The drop location can be any area that is designated as an activated area.

In this embodiment, the navigation panel 360 is populated with various channel designations (e.g., "Channel1", "Channel2", "Channel3", etc.), and each such designation is active, at least to the extent that the designation text itself and/or areas proximal to the designation text itself (e.g., hit boxes) can serve as an activated area, which in turn can serve as a drop location.

The drop event and information thereto (e.g., information about the "Item F1" and the "Item F1" itself, information about a folder, etc.) may be communicated over inter-vendor communication links. As depicted in this embodiment, a floating integration code widget $362_{FLOAT}$ is provided by the content management system to the web conferencing system (e.g., via inter-vendor communication). The floating integration code widget is generated by the content management system, and then integrated by the web conferencing system to be operable by any participant of the then-current web conference session. The floating integration code widget may be displayed in any area of the display surface, possibly floating over any of the graphical objects being displayed on the display surface.

In addition to a mouse gesture that is a drag-and-drop operation, and in addition to any form of emulation of a drag-and-drop event, it is possible for an item to be generated directly by operation of an application or app that runs on the user's device. The embodiment of FIG. 3B2 shows an application launcher 368 from which an application or app (e.g., "App1", . . . , "App99") can be launched. Strictly as one example, the application launcher can be associated with any particular context, such as the shown "Chat99" context. As such, invocation of "App1" from the "Chat99" context launches a text editor or might launch a presentation editor from within the "Chat99" context. As such, if and when a user executes a "Save File" operation of the application or app, the resulting saved file has the context of "Chat99". Furthermore, when the user executes a "Save File" operation of the application or app from the context of "Chat99", that "Save File" operation in the "Chat99" context is deemed to be equivalent to a drop event (e.g., drop of file "F1") into the "Chat99" context.

Upon notification of occurrence of such a drop event in the "Chat99" context the content management system generates and configures integration code to be delivered to at least one participant in the web conference session. In the shown embodiment, the generated and configured integration code is shown as previewer code widget 367.

In many configurations, and as depicted in the embodiment of FIG. 3B2, multiple generated and configured integration code instances can be concurrently displayed (e.g., on any display surface 301) and can be operational at any moment during the progression of any given web conference session. More particularly, each one of the multiple generated and configured integration code instances can be configured specifically with respect to characteristics of the dropped item. For example, a first generated and configured integration code instance can be configured for previewing a presentation, whereas a second generated and configured integration code instance can be configured for previewing a word-oriented document, and whereas a third generated and configured integration code instance can be configured for previewing a graphics-oriented document (e.g., a computer aided design (CAD) file), and so on.

In some embodiments, instances of the foregoing generated and configured integration code may serve as a proxy for a content management system application such as a content management system webapp. This is shown and described as pertains to FIG. 3C.

Figure 3C:
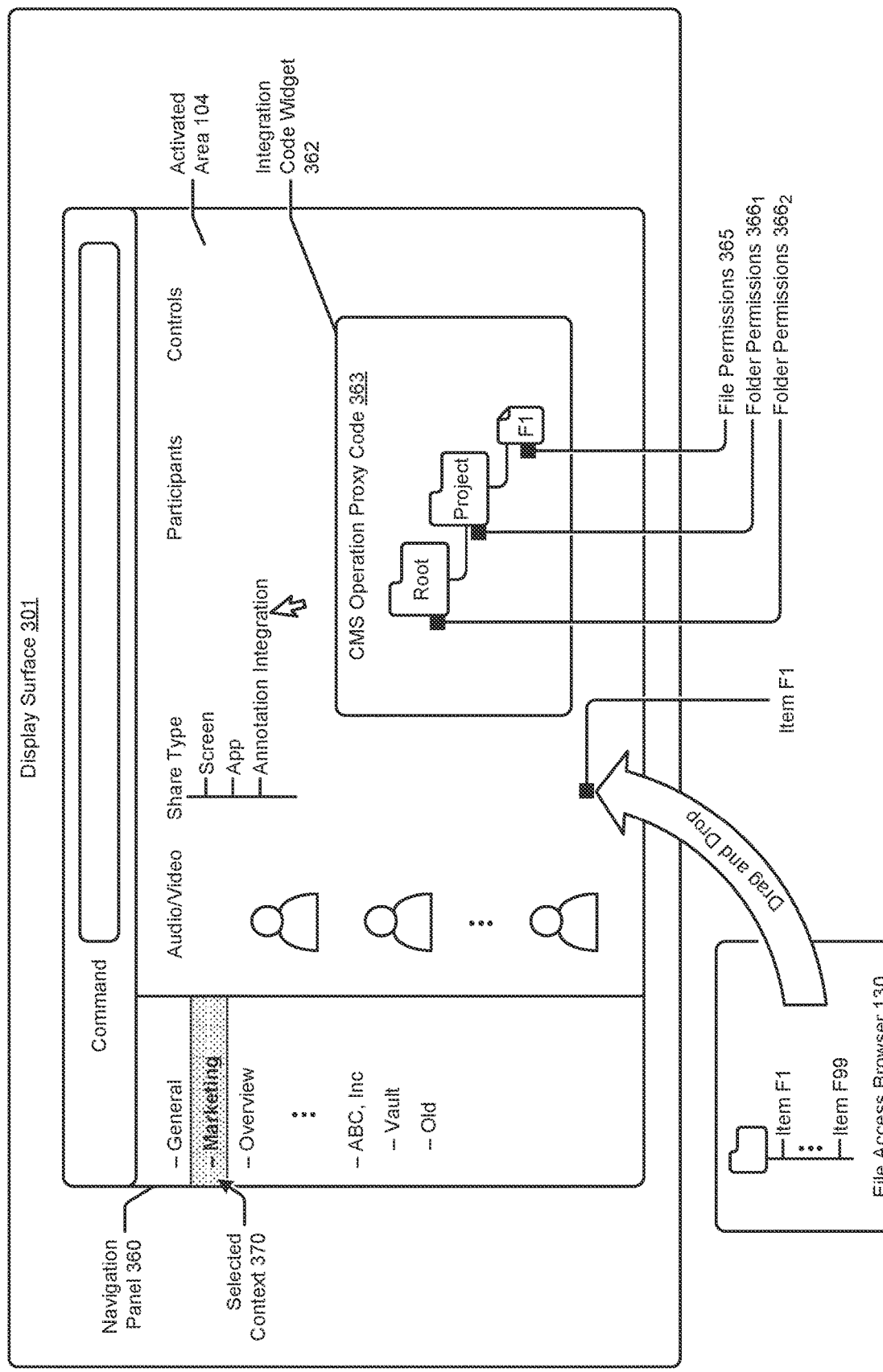
FIG. 3C depicts an example usage of a content management system proxy widget, as used in some embodiments.

FIG. 3C depicts an example usage of a content management system proxy widget. As an option, one or more variations of the content management system proxy widget or it graphical depiction, or any aspect thereof may be implemented in the context of the architecture and functionality of the embodiments described herein and/or in any environment.

As shown, a drag-and-drop operation serves to drop an item into activated area 104. In response, this drop event causes the content management system to generate and configure integration code that is a proxy for all operations of a content management system application. This is shown by the occurrence of CMS operation proxy code 363. In similar or identical fashion to the operation and look-and-feel of the content management system webapp, the CMS operation proxy code 363 displays a hierarchy comprising folders and files. In some cases, and as shown, each folder and/or file has associated permissions (e.g., file permissions 365, folder permissions $366_1$, folder permissions $366_2$). Such folder and/or file permissions refer to permissions granted to the participant for his/her access to the folders and files of the content management system.

Further details regarding general approaches to assigning permissions are described in U.S. application Ser. No. 16/948,838 titled "CROSS-PLATFORM COLLABORATION SYSTEMS" filed on Oct. 1, 2020, which is hereby incorporated by reference in its entirety.

Figure 4:
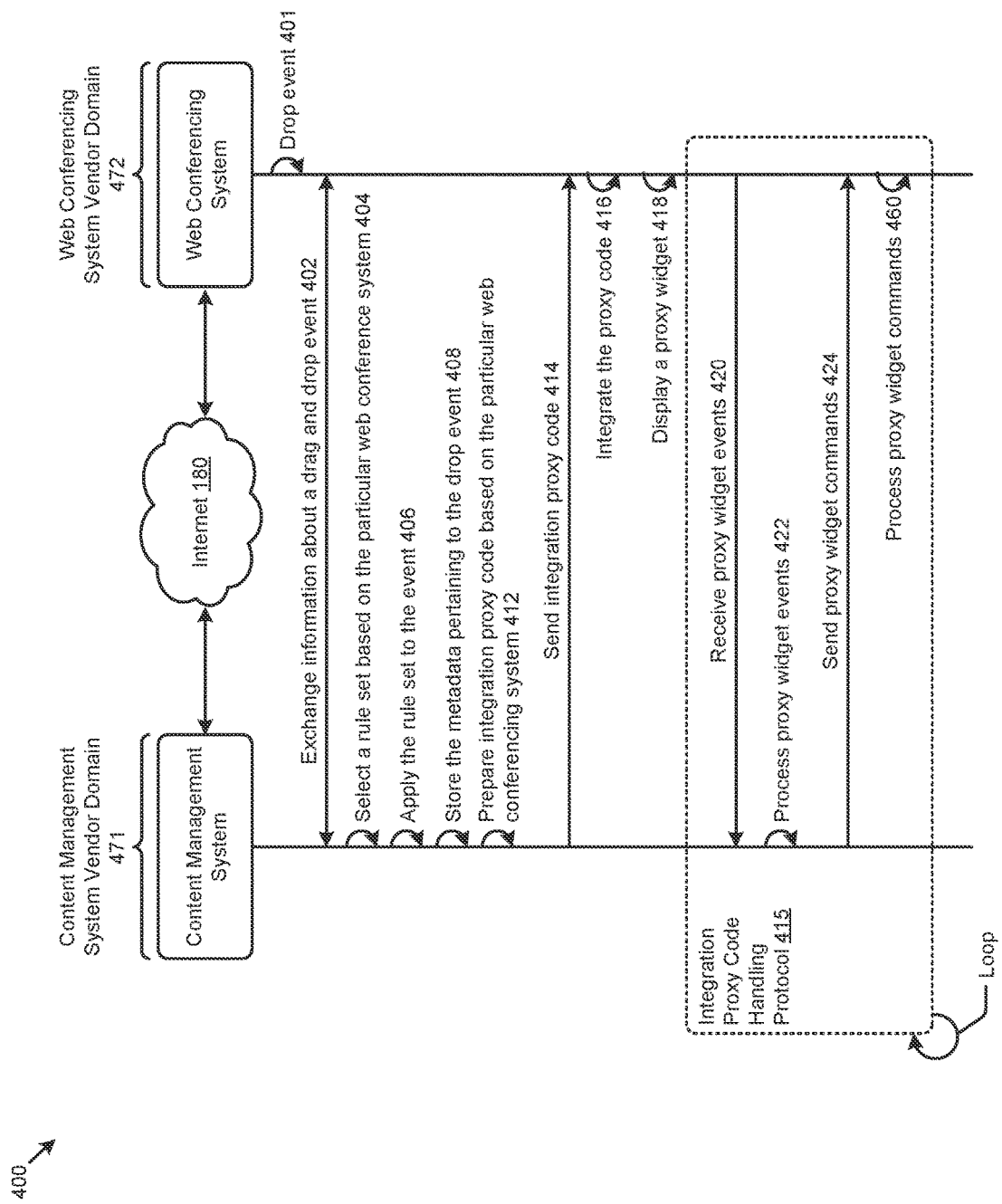
FIG. 4 depicts an inter-vendor communication protocol that implements platform-agnostic drag-and-drop operations by and between a content management system and a web conferencing system, according to an embodiment.

FIG. 4 depicts an inter-vendor communication protocol that implements platform-agnostic drag-and-drop operations by and between a content management system and a web conferencing system. As an option, one or more variations of protocol 400 or any aspect thereof may be implemented in the context of the architecture and functionality of the embodiments described herein and/or in any environment.

The figure is being presented to illustrate how inter-vendor communications are carried out so as to implement any of the herein-disclosed embodiments. As shown, operational elements in content management system vendor domain 471 communicate over Internet 180 to operational elements in web conferencing vendor domain 472. The figure presents merely illustrative portions of the protocol that is carried out between two vendor domains.

The shown protocol commences upon occurrence of a drop event 401, the occurrence of which drop event causes the web conferencing system to carry out inter-vendor communications with the content management system (inter-vendor communication 402). The content management system in turn selects a rule set based on aspects of the particular web conferencing system (operation 404), and then applies the selected rules (operation 406). In some cases, the content management system will derive or otherwise determine metadata pertaining to the drop event and store such metadata in association with any one or more content objects that are associated with or derived from the drop event (operation 408).

Based on characteristics of the drop event (e.g., based on the item corresponding to the drop event), and/or based on characteristics of the web conferencing system, the content management system prepares integration code. In this specific protocol of FIG. 4, the content management system prepares integration proxy code (operation 412) and sends the integration proxy code to the web conferencing system (inter-vendor communication 414). The web conferencing system then integrates the proxy code (via operation 416) and displays a proxy widget (via operation 418) on the display surface of at least one web conference participant's user device. An integration proxy code handling protocol 415 is then entered. The handling protocol can be carried out in a loop, wherein the content management system receives proxy widget events from the web conferencing system (inter-vendor communication 420), processes the received proxy widget events (operation 422) and sends proxy widget commands back to the web conferencing system (inter-vendor communication 424). The web conferencing system receives such proxy widget commands from the content management system and, in response, the web conferencing system processes the received proxy widget commands (operation 460). In some cases, the proxy widget commands received at the web conferencing system are received into the proxy widget itself. Strictly as an example, a particular proxy widget event might be to zoom-in to a particular portion of a presentation slide. Such a proxy widget event is raised at the web conferencing system by operation of the proxy widget by a participant (e.g., host of the web conference session). That zoom-in event is sent to the content management system for processing. Such processing might entail manipulation of metadata (e.g., to establish a view state of the presentation) and/or such processing might entail manipulation of content objects at the content management system, and/or such processing might entail forming one or more proxy widget commands that are sent to other proxy widgets that are currently active (e.g., in operation on a user device of a web conference participant of a then-current web conference session). Strictly as examples, Table 1 provides example processing responses to specific user actions.

TABLE 1

Example Processing Responses to User Actions

| User Action | Processing Response |
|---|---|
| Click or touch a file, folder, or other item icon | Generate a thumbnail of the corresponding icon (e.g., based on the Type of the item) Enable edit capability for users with edit permission(s) Allow in-line commenting and/or whiteboard or glassboard commenting |
| Activate via an "open with" dialog | Initiate live editing session for all who have edit permission(s) Process explicit and implicit "Save" events to save at the CMS (e.g., with versioning) Concurrently process "Add User" dialogs |
| User interaction with widget menus or previewer menus | Display classifications, policies, and/or other metadata Display workflow triggering options Receive and display incoming notifications Display history and/or feeds Launch third-party apps Launch CMS search toolbar Launch search result action toolbar |

In some cases, and referring to certain rows of Table 1, if a user clicks on a content object icon, then a thumbnail preview is generated and displayed on the web conferencing system display surface. Many content object "file types" are possible, including video files, CAD formats, vendor-specific formats, etc. In some cases the user is permitted to make annotations onto and/or comments into the content object.

Further details regarding general approaches to making annotation onto content objects are described in U.S. application Ser. No. 17/163,259 titled "SAVING AN OVERLAY ANNOTATION IN ASSOCIATION WITH A SHARED DOCUMENT" filed on Jan. 29, 2021, which is hereby incorporated by reference in its entirety.

In certain situations when the user has sufficient editing or co-authoring permissions, then if the user opens the content object in the "Open With" flow, then the user can participate in a live co-editing session within the web conferencing system. Changes are automatically saved back into the content management system, even though the changes were initiated from within user interface of the web conferencing system. In some situations, the foregoing live co-authoring and co editing activities can involve multiple users, any of whom can simultaneously enter the session and simultaneously edit the document. Such edits are saved by the content management system as the edits occur. Revision history logs and version designations are supported.

Using the proxy widget, users with sufficient permissions can add additional collaborators, who in turn can become editors. Adding additional collaborators can be performed during the progression of the web conference session by using the proxy widget. In some embodiments, the proxy widget permits initiation of any action that can be performed at or by the content management system. More specifically, any action that is supported by the content management system is extended into the proxy widget. Strictly as examples, such actions include display and modification of content object classifications and policies, display and modification of metadata, display, creation, modification, and invocation of workflows, completion of workflow steps, etc. Moreover, if and when a workflow progresses to a next step or if and when a workflow is completed, then the user may receive notifications of occurrences of such events. In some cases, a workflow or other event can cause a processing flow to enter into third party integrations (e.g. to send a content object to an e-signature facility, to send content object to a messaging system for sharing, etc.).

In some embodiments still further user actions can be performed from within a web conferencing session and, more particularly, by using one or more user interfaces that are active during the web conferencing session. For example, using one or more user interfaces provided by the proxy widget, users can carry out any of the user actions given in Table 2. The content management system can initiate processes in response to the foregoing user actions. Moreover, the content management system can initiate processing (e.g., in response to a user action) with or without further facilitation by the web conferencing system. Examples of such user actions and responses to the user action are given in Table 2.

TABLE 2

Example processing responses to user actions

| User Action | Processing Response |
|---|---|
| Interact with a sharing facility of the proxy widget | Create shared links (e.g., unique URLs) to access corresponding content of the content management system<br>Apply user-selected permissions to allow/deny access based on a user's identity<br>Establish revokable and/or automatically expiring permissions based on enterprise designations and/or based on the user identities of collaborators<br>Establish password-protected and/or custom URLs that are created for sharing ease-of use |
| Interact with a statistics analysis facility of the proxy widget | Display automatically recorded statistics pertaining to a history of actions taken on a file or folder<br>Display statistics such as (a) a number of views, (b) a number of downloads, (c) a number of edits, (d) occurrences and/or timestamps of comments, (e) user identities corresponding to occurrences of comments |
| Interact with a content object categorization facility of the proxy widget | Display and permit user interaction over categories of files or folders (e.g., recently accessed files or folder, items marked as "Favorites", etc.)<br>Display and permit user interaction over items marked as specific "Collections", which collections represent user-organized views of files and folders |
| Interact with a content object version management facility of the proxy widget | Display and permit user interaction over versions of a file<br>Display and permit user preview of a version of a content object<br>Display and permit user interaction over a history of versions<br>Display and permit preview over a historical version using the same previewer capabilities as were applied to that specified historical version |
| Interact with a metadata filtering facility of the proxy widget | Enable a file content viewer or folder content viewer for easy access (e.g., a listing or "pin" of file icons) that appear at top a of page for easy access/viewing<br>Enable clickable dropdowns to create filtered views of folder based on system- or user-specified metadata filters |
| Interact in a real-time collaborative editing session | Enable a real-time concurrent editing session over a file<br>Enable automatic security labeling, compliance labeling, etc.<br>Automatically embed tables and images for concurrent editing<br>Create and publish quiescent states<br>Annotate the file with visual indicators that highlight changes made during the course of the real-time collaborative editing session |
| Interact with an electronic signing facility of the proxy widget | Send a file to a set of one or more signatories so as to obtain native, verified electronic signatures from the one or more signatories<br>Verify email aliases of signatories and other recipients, verify identities of signatories and other recipients, check authentication certificates, certify digital signatures of signatories and other recipients, etc. |

Further details regarding general approaches to handling third party integrations are described in U.S. application Ser. No. 16/726,093 titled "EXTENSIBLE WORKFLOW ACCESS" filed on Dec. 23, 2019, which is hereby incorporated by reference in its entirety.

In still further embodiments, the proxy widget permits on-the-fly generation of forms that can in turn be used to collect items and metadata that is then copied into a selected folder hierarchy at the content management system. Such metadata may include a full history of activities that have been taken on any particular content object (e.g. history of comments, history of annotations, history of invocation of 3rd party integrations, etc.)

In some embodiments, the content management system and its corresponding proxy widget supports searching operations, feed operations, and other operations that identify content objects and/or display content objects in accordance with user specifications (e.g., pin content objects, filter and view of content objects and/or their contents, browse content objects within a folder based on metadata specifications, etc.).

In some of the foregoing examples, specifically where one or more proxy widget commands (e.g., file manipulation commands) are sent to other proxy widgets that are currently active might involve permissions checking, so as to observe any permissions (e.g., allow or deny content object accesses and/or operations). In some cases, a particular web conference participant of a then-current web conference session is also a registered user of the content management system. However, it can happen that particular web conference participant of a then-current web conference session is not a registered user of the content management system, and therefore does not have permissions to access content objects of the content management system. In such cases, it is possible to at least temporarily impute permissions to a web conference participant of a then-current web conference session who is not a registered user of the content management system.

Figure 5:
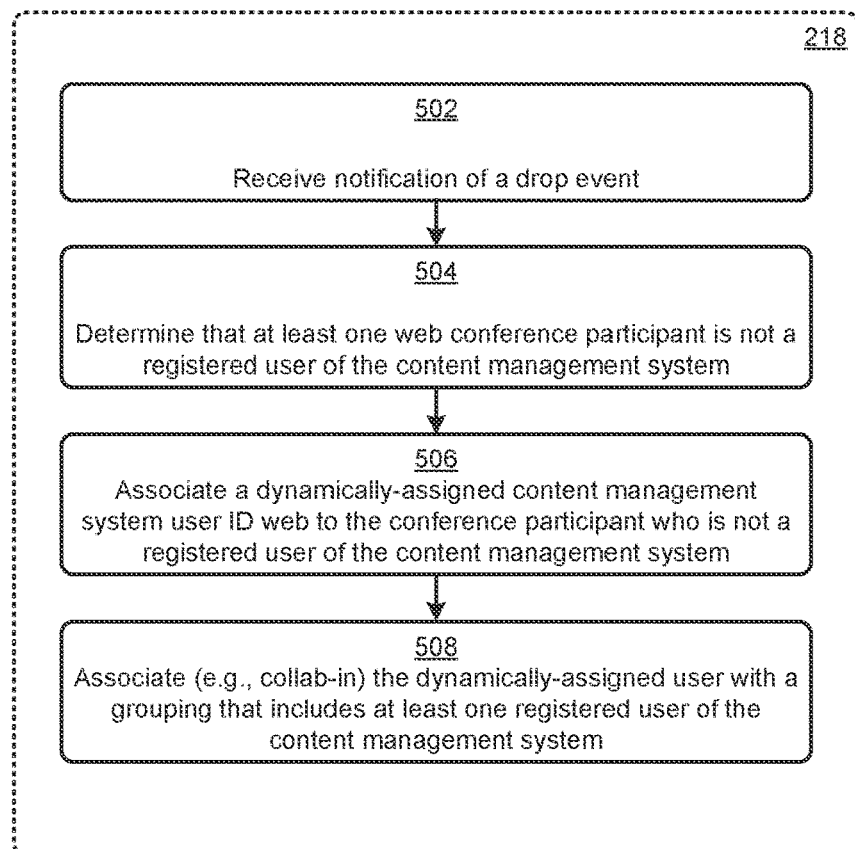
FIG. 5 presents an example processing flow as used to implement sharing of content objects of a content management system with web conferencing system participants, according to an embodiment.

FIG. 5 presents an example processing flow as used to implement sharing of content objects of a content management system with web conference participants who are not registered users of the content management system. As an option, one or more variations of processing flow 500 or any aspect thereof may be implemented in the context of the architecture and functionality of the embodiments described herein and/or in any environment.

The shown flow is merely one example implementation of step 218 of FIG. 2. More specifically the shown flow is merely one example of how the collaboration regime of the content management system can be modified to permit a participant of the web conferencing system who is not a registered user of the content management system to at least temporarily have access to a shared content object of the content management system. The example flow commences when the content management system receives a notification of a drop event (step 502). The content management then determines that there is at least one web conference participant who is not a registered user of the content management system (step 504). This situation at least potentially creates a problem in that content objects that might be attempted to be accessed from within a web conference window (e.g., via an integration widget code), might not have privileges to allow access by those who are not registered users of the content management system. To remedy this potential problem, the content management system associates a dynamically-determined, system-assigned content management system user ID to the web participant who is not already a registered user of the content management system (step 506). The flow continues at step 508 by associating (e.g., collabing-in) the dynamically-determined, system-assigned content management system user ID into a group that includes at least one registered user. In some cases, the dynamically-determined, system-assigned content management system user ID inherits the permissions of the group that includes at least one registered user. In some cases, the dynamically-determined, system-assigned content management system user ID inherits the permissions of a registered user the group.

Additional Embodiments of the Disclosure

Instruction Code Examples

Figure 6:
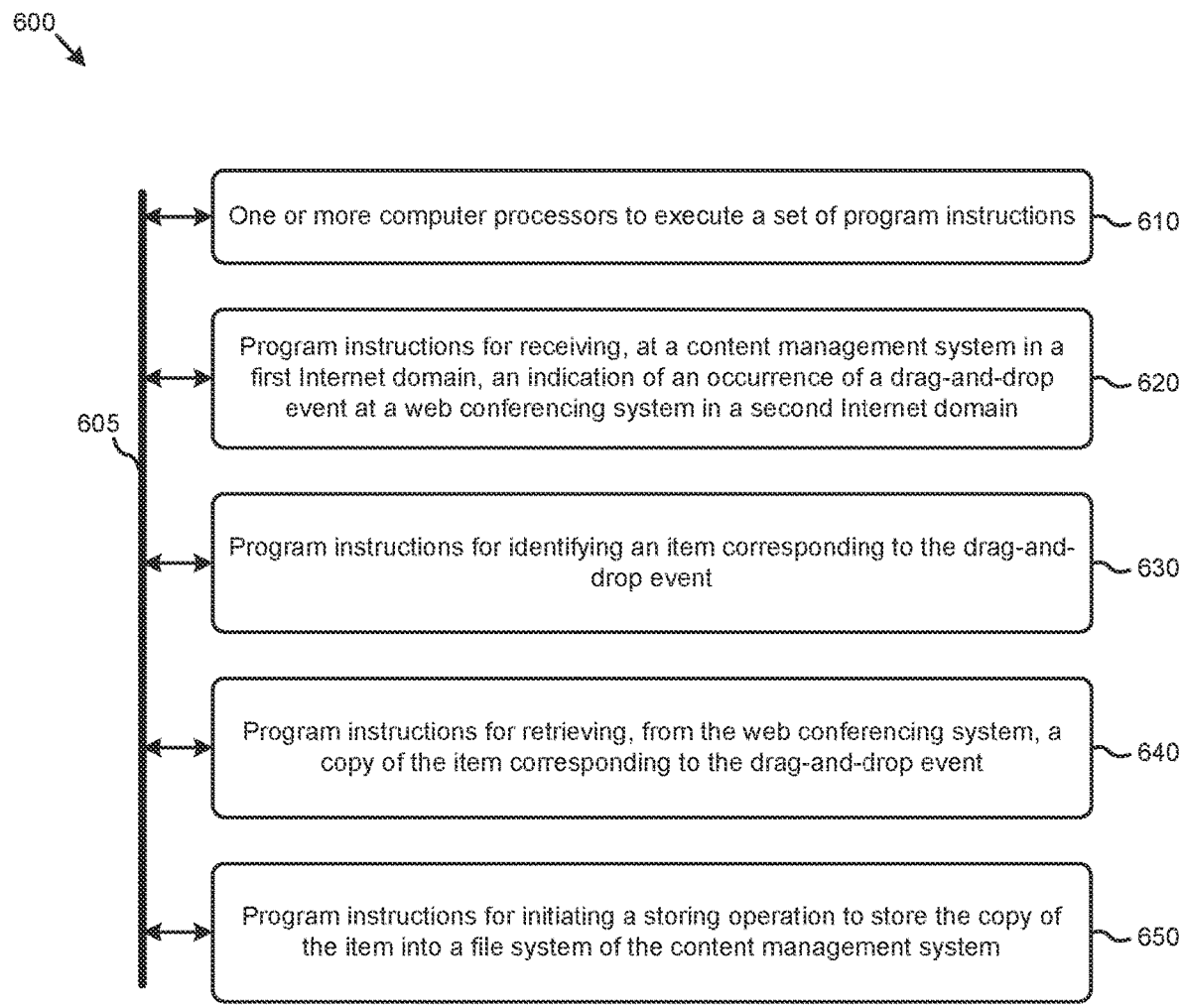
FIG. 6 depicts computing components as arrangements of computing modules that are interconnected so as to implement certain of the herein-disclosed embodiments.

FIG. 6 depicts a computing system 600 as an arrangement of computing modules that are interconnected so as to operate cooperatively to implement certain of the herein-disclosed embodiments. This and other embodiments present particular arrangements of elements that, individually or as combined, serve to form improved technological processes that address supporting drag-and-drop operations for a wide range of web conferencing systems. The partitioning of computing system 600 is merely illustrative and other partitions are possible. As an option, the computing system 600 may be implemented in the context of the architecture and functionality of the embodiments described herein. Of course, however, the computing system 600 or any operation therein may be carried out in any desired environment. The computing system 600 comprises at least one processor and at least one memory, the memory serving to store program instructions corresponding to the operations of the system. As shown, an operation can be implemented in whole or in part using program instructions accessible by a module. The modules are connected to a communication path 605, and any operation can communicate with any other operations over communication path 605. The modules of the system can, individually or in combination, perform method operations within computing system 600. Any operations performed within computing system 600 may be performed in any order unless as may be specified in the claims. The shown embodiment implements a portion of a computer system, presented as computing system 600, comprising one or more computer processors to execute a set of program code instructions (module 610) and modules for accessing memory to hold program code instructions to perform: receiving, at a content management system in a first Internet domain, an indication of an occurrence of a drag-and-drop event at a web conferencing system in a second Internet domain (module 620); identifying an item corresponding to the drag-and-drop event (module 630); retrieving, from the web conferencing system, a copy of the item corresponding to the drag-and-drop event (module 640); and initiating a storing operation to store the copy of the item into a file system of the content management system (module 650).

Variations of the foregoing may include more or fewer of the shown modules. Certain variations may perform more or fewer (or different) steps and/or certain variations may use data elements in more, or in fewer, or in different operations. Still further, some embodiments include variations in the operations performed, and some embodiments include variations of aspects of the data elements used in the operations.

System Architecture Overview

Additional System Architecture Examples

Figure 7A:
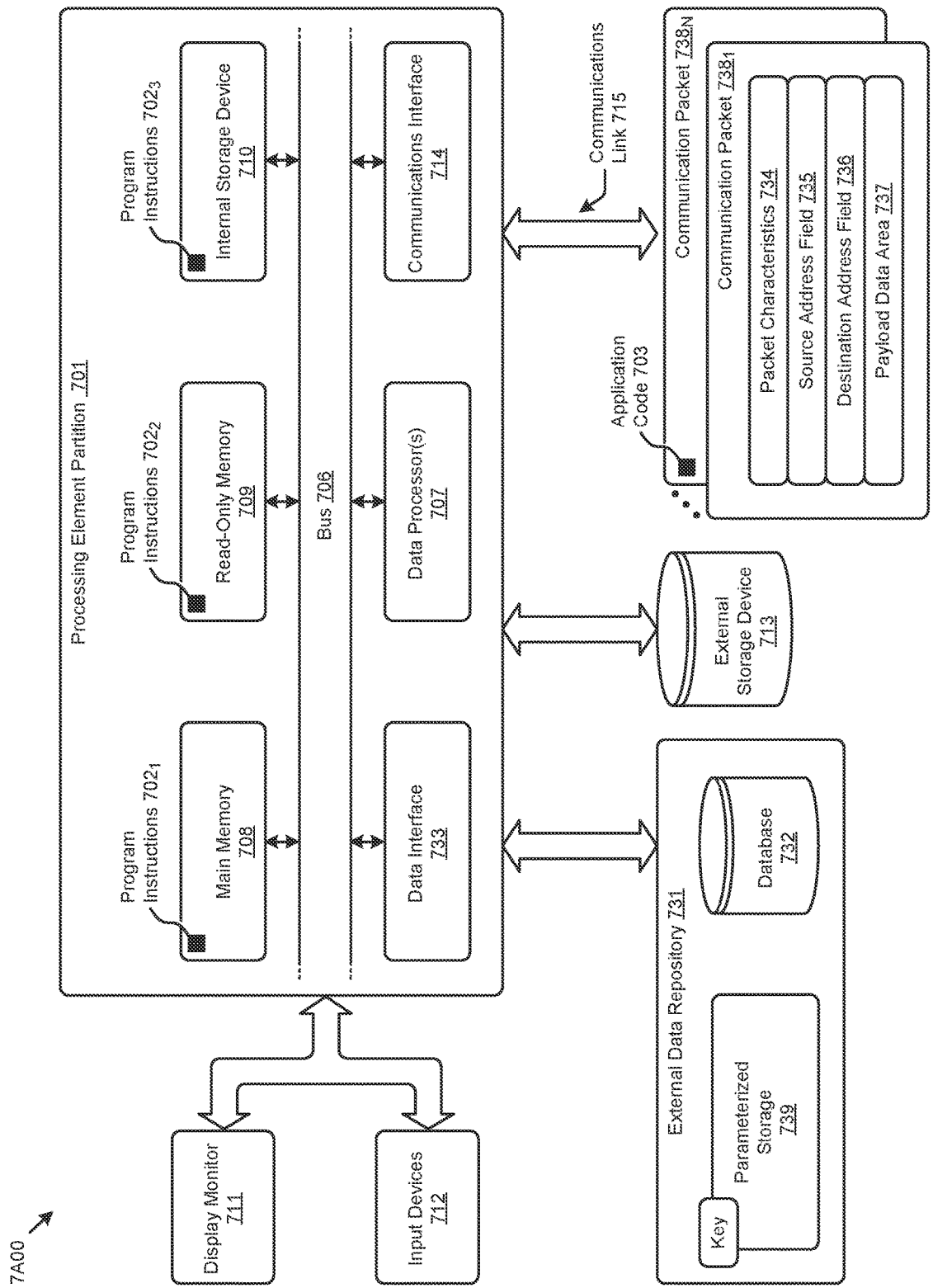
FIG. 7A and FIG. 7B present block diagrams of computer system architectures having components suitable for implementing embodiments of the present disclosure and/or for use in the herein-described environments.

FIG. 7A depicts a block diagram of an instance of a computer system 7A00 suitable for implementing embodiments of the present disclosure. Computer system 7A00 includes a bus 706 or other communication mechanism for communicating information. The bus interconnects subsystems and devices such as a central processing unit (CPU), or a multi-core CPU (e.g., data processor 707), a system memory (e.g., main memory 708, or an area of random access memory (RAM)), a non volatile storage device or non-volatile storage area (e.g., read-only memory 709), an internal storage device 710 or external storage device 713 (e.g., magnetic or optical), a data interface 733, a communications interface 714 (e.g., PHY, MAC, Ethernet interface, modem, etc.). The aforementioned components are shown within processing element partition 701, however other partitions are possible. Computer system 7A00 further comprises a display 711 (e.g., CRT or LCD), various input devices 712 (e.g., keyboard, cursor control), and an external data repository 731.

According to an embodiment of the disclosure, computer system 7A00 performs specific operations by data processor 707 executing one or more sequences of one or more program instructions contained in a memory. Such instructions (e.g., program instructions $702_1$, program instructions $702_2$, program instructions $702_3$, etc.) can be contained in or can be read into a storage location or memory from any computer readable/usable storage medium such as a static storage device or a disk drive. The sequences can be organized to be accessed by one or more processing entities configured to execute a single process or configured to execute multiple concurrent processes to perform work. A processing entity can be hardware-based (e.g., involving one or more cores) or software-based, and/or can be formed using a combination of hardware and software that implements logic, and/or can carry out computations and/or processing steps using one or more processes and/or one or more tasks and/or one or more threads or any combination thereof.

According to an embodiment of the disclosure, computer system 7A00 performs specific networking operations using one or more instances of communications interface 714. Instances of communications interface 714 may comprise one or more networking ports that are configurable (e.g., pertaining to speed, protocol, physical layer characteristics, media access characteristics, etc.) and any particular instance of communications interface 714 or port thereto can be configured differently from any other particular instance. Portions of a communication protocol can be carried out in whole or in part by any instance of communications interface 714, and data (e.g., packets, data structures, bit fields, etc.) can be positioned in storage locations within communications interface 714, or within system memory, and such data can be accessed (e.g., using random access addressing, or using direct memory access DMA, etc.) by devices such as data processor 707.

Communications link 715 can be configured to transmit (e.g., send, receive, signal, etc.) any types of communications packets (e.g., communication packet $738_1$, communication packet $738_N$) comprising any organization of data items. The data items can comprise a payload data area 737, a destination address 736 (e.g., a destination IP address), a source address 735 (e.g., a source IP address), and can include various encodings or formatting of bit fields to populate packet characteristics 734. In some cases, the packet characteristics include a version identifier, a packet or payload length, a traffic class, a flow label, etc. In some cases, payload data area 737 comprises a data structure that is encoded and/or formatted to fit into byte or word boundaries of the packet.

In some embodiments, hard-wired circuitry may be used in place of or in combination with software instructions to implement aspects of the disclosure. Thus, embodiments of the disclosure are not limited to any specific combination of hardware circuitry and/or software. In embodiments, the term "logic" shall mean any combination of software or hardware that is used to implement all or part of the disclosure.

The term "computer readable medium" or "computer usable medium" as used herein refers to any medium that participates in providing instructions to data processor 707 for execution. Such a medium may take many forms including, but not limited to, non-volatile media and volatile media. Non-volatile media includes, for example, optical or magnetic disks such as disk drives or tape drives. Volatile media includes dynamic memory such as RAM.

Common forms of computer readable media include, for example, floppy disk, flexible disk, hard disk, magnetic tape, or any other magnetic medium; CD-ROM or any other optical medium; punch cards, paper tape, or any other physical medium with patterns of holes; RAM, PROM, EPROM, FLASH-EPROM, or any other memory chip or cartridge, or any other non-transitory computer readable medium. Such data can be stored, for example, in any form of external data repository 731, which in turn can be formatted into any one or more storage areas, and which can comprise parameterized storage 739 accessible by a key (e.g., filename, table name, block address, offset address, etc.).

Execution of the sequences of instructions to practice certain embodiments of the disclosure are performed by a single instance of a computer system 7A00. According to certain embodiments of the disclosure, two or more instances of computer system 7A00 coupled by a communications link 715 (e.g., LAN, public switched telephone network, or wireless network) may perform the sequence of instructions required to practice embodiments of the disclosure using two or more instances of components of computer system 7A00.

Computer system 7A00 may transmit and receive messages such as data and/or instructions organized into a data structure (e.g., communications packets). The data structure can include program instructions (e.g., application code 703), communicated through communications link 715 and communications interface 714. Received program instructions may be executed by data processor 707 as it is received and/or stored in the shown storage device or in or upon any other non volatile storage for later execution. Computer system 7A00 may communicate through a data interface 733 to a database 732 on an external data repository 731. Data items in a database can be accessed using a primary key (e.g., a relational database primary key).

Processing element partition 701 is merely one sample partition. Other partitions can include multiple data processors, and/or multiple communications interfaces, and/or multiple storage devices, etc. within a partition. For example, a partition can bound a multi-core processor (e.g., possibly including embedded or co-located memory), or a partition can bound a computing cluster having plurality of computing elements, any of which computing elements are connected directly or indirectly to a communications link. A first partition can be configured to communicate to a second partition. A particular first partition and particular second partition can be congruent (e.g., in a processing element array) or can be different (e.g., comprising disjoint sets of components).

A module as used herein can be implemented using any mix of any portions of the system memory and any extent of hard-wired circuitry including hard-wired circuitry embodied as a data processor 707. Some embodiments include one or more special-purpose hardware components (e.g., power control, logic, sensors, transducers, etc.). Some embodiments of a module include instructions that are stored in a memory for execution so as to facilitate operational and/or performance characteristics pertaining to handling web conferencing system upload events in a content management system. A module may include one or more state machines and/or combinational logic used to implement or facilitate the operational and/or performance characteristics pertaining to handling web conferencing system upload events in a content management system.

Various implementations of database 732 comprise storage media organized to hold a series of records or files such that individual records or files are accessed using a name or key (e.g., a primary key or a combination of keys and/or query clauses). Such files or records can be organized into one or more data structures (e.g., data structures used to implement or facilitate aspects of handling web conferencing system upload events in a content management system). Such files, records, or data structures can be brought into and/or stored in volatile or non-volatile memory. More specifically, the occurrence and organization of the foregoing files, records, and data structures improve the way that the computer stores and retrieves data in memory, for example, to improve the way data is accessed when the computer is performing operations pertaining to handling web conferencing system upload events in a content management system, and/or for improving the way data is manipulated when performing computerized operations pertaining to processing drag-and-drop events based on characteristics of a particular web conferencing system.

Figure 7B:
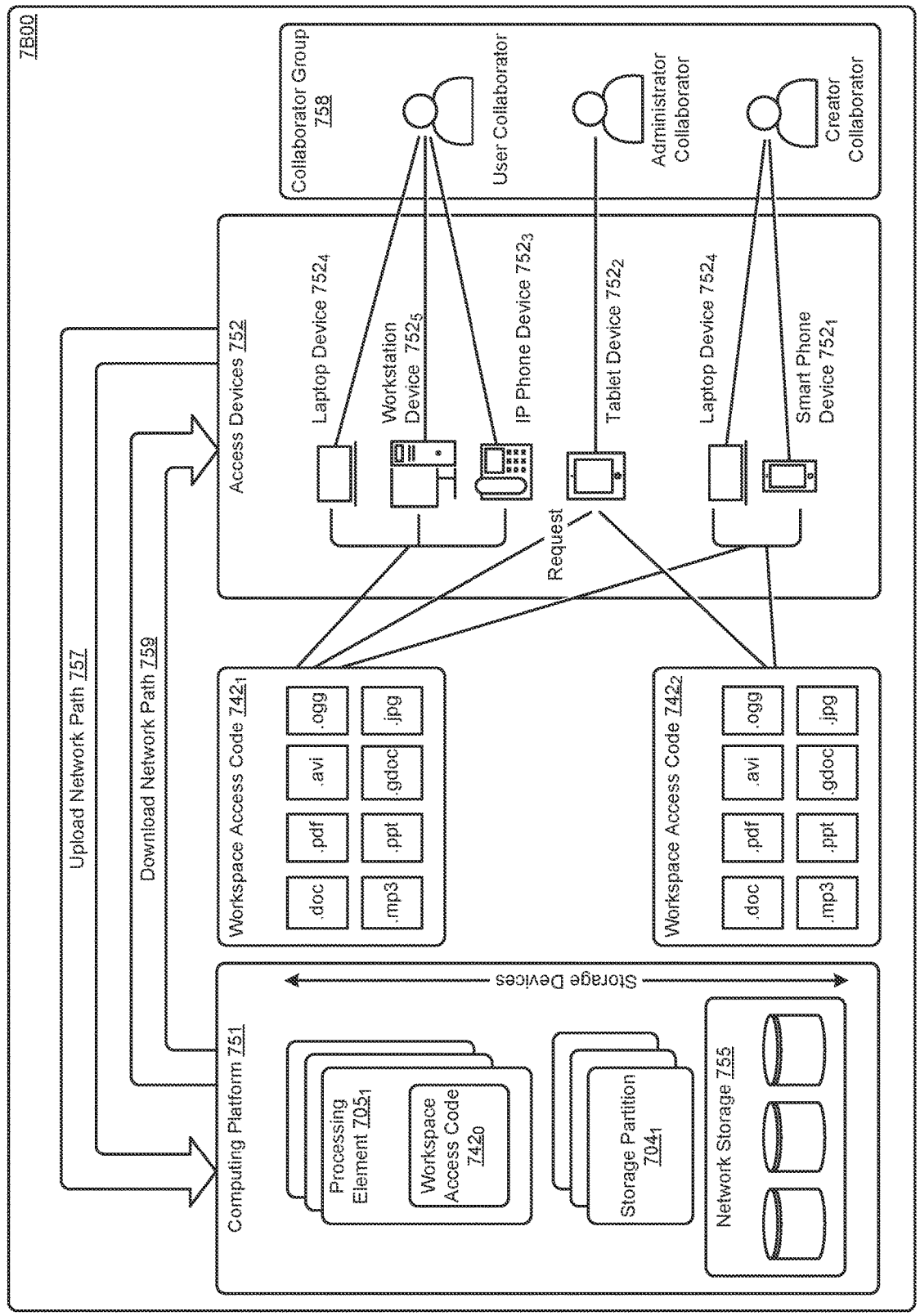

FIG. 7B depicts a block diagram of an instance of a cloud-based environment 7B00. Such a cloud-based environment supports access to workspaces through the execution of workspace access code (e.g., workspace access code $742_0$, workspace access code $742_1$, and workspace access code $742_2$). Workspace access code can be executed on any of access devices 752 (e.g., laptop device $752_4$, workstation device $752_5$, IP phone device $752_3$, tablet device $752_2$, smart phone device $752_1$, etc.), and can be configured to access any type of object. Strictly as examples, such objects can be folders or directories or can be files of any filetype. The files or folders or directories can be organized into any hierarchy. Any type of object can comprise or be associated with access permissions. The access permissions in turn may correspond to different actions to be taken over the object. Strictly as one example, a first permission (e.g., PREVIEW ONLY) may be associated with a first action (e.g., preview), while a second permission (e.g., READ) may be associated with a second action (e.g., download), etc. Furthermore, permissions may be associated to any particular user or any particular group of users.

A group of users can form a collaborator group 758, and a collaborator group can be composed of any types or roles of users. For example, and as shown, a collaborator group can comprise a user collaborator, an administrator collaborator, a creator collaborator, etc. Any user can use any one or more of the access devices, and such access devices can be operated concurrently to provide multiple concurrent sessions and/or other techniques to access workspaces through the workspace access code.

A portion of workspace access code can reside in and be executed on any access device. Any portion of the workspace access code can reside in and be executed on any computing platform 751, including in a middleware setting. As shown, a portion of the workspace access code resides in and can be executed on one or more processing elements (e.g., processing element $705_1$). The workspace access code can interface with storage devices such as networked storage 755. Storage of workspaces and/or any constituent files or objects, and/or any other code or scripts or data can be stored in any one or more storage partitions (e.g., storage partition $704_1$). In some environments, a processing element includes forms of storage, such as RAM and/or ROM and/or FLASH, and/or other forms of volatile and non-volatile storage.

A stored workspace can be populated via an upload (e.g., an upload from an access device to a processing element over an upload network path 757). A stored workspace can be delivered to a particular user and/or shared with other particular users via a download (e.g., a download from a processing element to an access device over a download network path 759).

In the foregoing specification, the disclosure has been described with reference to specific embodiments thereof. It will, however, be evident that various modifications and changes may be made thereto without departing from the broader spirit and scope of the disclosure. For example, the above-described process flows are described with reference to a particular ordering of process actions. However, the ordering of many of the described process actions may be changed without affecting the scope or operation of the disclosure. The specification and drawings are to be regarded in an illustrative sense rather than in a restrictive sense.

What is claimed is:

1. A method for processing events between a web conferencing system and a content management system, the method comprising:

identifying a web conferencing system provided by a first party that provides web conferencing, wherein the web conferencing system provides screen sharing such that a computing desktop is shared between users of the web conferencing system, wherein the web conferencing system implements a first computing system in a first network domain;

identifying a content management system provided by a second party that provides collaboration tools, wherein the second party is different from the first party and wherein the content management system implements a second computing system in a second network domain that is different from the first network domain;

receiving a network communication pertaining to a user interface event from the first network domain, wherein the network communication from the first network domain is sent to the second network domain when a user interface of the web conferencing system is used by one or more participants of a web conference session to bring a file or folder into the web conference session of the web conferencing system as a drag-and-drop event of the file or folder into a display area that is displaying a shared desktop shared by a first user that is screen sharing with a second user of the web conferencing system, wherein the second user is not a user of the content management system; and responsive to receiving the network communication from the first network domain, making the file or folder available to the one or more participants of the web conference session via the content management system by:

analyzing the network communication from the first network domain to (1) determine an identity of a registered user of the content management system, and to (2) determine an identification of an item that corresponds to the file or folder to be stored in a location accessible by the registered user;

in response to determining the identity of the registered user of the content management system, accessing the content management system to identify a collaboration group associated with the registered user and to identify a storage location for the file or folder; and storing the file or folder into the storage location and configuring the file or folder to allow access to the file or folder by the one or more participants of the web conference session, wherein storage location permissions of the collaboration group associated with the registered user are propagated to store the file or folder when the second user of the web conferencing system is not registered with the content management system.

2. The method of claim 1, further comprising:
applying, to the file or folder, storage location permissions derived from information pertaining to the collaboration group associated with the registered user.

3. The method of claim 2, further comprising:
modifying the storage location permissions to make the file or folder available to participants of the web conference session for a limited duration after the web conference session has ended.

4. The method of claim 1, further comprising:
dynamically generating, at the content management system, a user ID;
associating, at the content management system, the user ID to the second user of the web conferencing system, wherein
the user ID is associated with the collaboration group with at least one registered user of the content management system, and
the user ID inherits the storage location permissions of the at least one registered user of the content management system;
propagating the storage location permissions to permit access by the second user associated with the user ID to store the file or folder.

5. The method of claim 4, wherein the storage location permissions inherited by the user ID make the file or folder available to the second user for a limited duration after the web conference session has ended.

6. The method of claim 1, further comprising:
determining, based on aspects of the web conferencing system, a directory hierarchy of a file system of the content management system.

7. The method of claim 1, wherein the user interface of the web conferencing system functions to raise at least one of, (1) a drag-and-drop event, (2) a copy-and-paste drop event, or a save file event.

8. The method of claim 7, further comprising:
determining at the content management system, a web conferencing system identity that is unique to one of a plurality of web conferencing facilities;
selecting one or more processing options, wherein selecting the one or more processing options depends at least in part on the web conferencing system identity; and
storing at least one file or folder corresponding to the drag-and-drop event in a directory hierarchy of the content management system.

9. The method of claim 8, further comprising:
deriving, based on aspects of a registered user of the content management system, metadata corresponding to the at least one file or folder.

10. The method of claim 9, further comprising:
deriving, based on aspects of the collaboration group of the content management system, metadata corresponding to the at least one file or folder.

11. The method of claim 10, wherein the registered user of the content management system is a participant in a session of the web conferencing system.

12. The method of claim 1, further comprising:
applying a label to the file or folder, the label corresponding to at least one of, a user handling rule, an item handling rule, or governance and regulations rules.

13. The method of claim 1, further comprising:
configuring integration code based at least in part on an aspect of the web conferencing system; and
sending the integration code to the web conferencing system.

14. The method of claim 13, wherein the integration code comprises at least a portion of a previewer.

15. The method of claim 13, wherein the integration code comprises proxy code that emulates operations of the content management system.

16. The method of claim 13, further comprising:
receiving, at the content management system, one or more events raised by the integration code.

17. The method of claim 13, wherein the integration code is configured to carry out a protocol between the web conferencing system and the content management system.

18. The method of claim 17, wherein the protocol comprises at least one message to cause the content management system to gather classifications pertaining to the file or folder; and
invoking a workflow of the content management system to operate over the file or folder.

19. The method of claim 1, wherein the content management system is provided by a first entity that owns a first Internet domain and wherein the web conferencing system is provided by a second entity that owns a second Internet domain that is different from the first Internet domain.

20. The method of claim 19, wherein the first entity operates a first Internet firewall, and wherein the second entity operates a second Internet firewall.

21. The method of claim 19, wherein the first entity holds a first authentication certificate corresponding to the first network domain, and wherein the second entity holds a second authentication certificate corresponding to the second network domain.

22. A method for processing events between of a web conferencing system managed within first computing environment of a first party and a content management system managed within a second computing environment of a second party, the method comprising:
receiving, at the content management system in a first Internet domain, an indication of an occurrence of a drag-and-drop event at a web conferencing system in a second Internet domain, wherein the web conferencing system provides screen sharing such that a computing desktop is shared between users of the web conferencing system and the drag-and-drop event involves an object that is dragged and dropped into a display area that is displaying a shared desktop shared by a first user that is screen sharing with a second user of the web conferencing system, wherein the second user is not a user of the content management system;
identifying a registered user of the content management system and a file or folder corresponding to the drag-and-drop event, wherein the registered user is associated with a collaboration group;

retrieving, from the web conferencing system, a copy of the file or folder corresponding to the drag-and-drop event; and initiating a storing operation to store the copy of the file or folder into a file system of the content management system, wherein storage location permissions of the collaboration group associated with the registered user are propagated to store the file or folder when the second user of the web conferencing system is not registered with the content management system.

23. The method of claim 22, further comprising:

determining, based on aspects of the web conferencing system, a directory hierarchy of a file system of the content management system;

selecting a location within the directory hierarchy of the content management system; and storing at least a portion of the file or folder in the location.

24. The method of claim 22, further comprising:

modifying file or folder permissions to make the copy of the file or folder available to participants of a web conference session for a limited duration after the web conference session has ended.

25. The method of claim 22, further comprising:

dynamically generating, at the content management system, a user ID;

associating, at the content management system, the user ID to the second user of the web conferencing system, wherein the user ID is associated with the collaboration group with at least one registered user of the content management system, and the user ID inherits the storage location permissions of the at least one registered user of the content management system;

propagating the file or folder permissions to permit access to the copy of the file or folder by the second user associated with the user ID to store the copy of the file or folder.

26. A non-transitory computer readable medium having stored thereon a sequence of instructions which, when stored in memory and executed by one or more processors causes the one or more processors to perform a set of acts for processing events between of a web conferencing system managed within a first computing environment of a first party and a content management system managed within a second computing environment of a second party, the set of acts comprising:

receiving, at the content management system in a first Internet domain, an indication of an occurrence of a drag-and-drop event at a web conferencing system in a second Internet domain, wherein the web conferencing system provides screen sharing such that a computing desktop is shared between users of the web conferencing system and the drag-and-drop event involves an object that is dragged and dropped into a display area that is displaying a shared desktop shared by a first user that is screen sharing with a second user of the web conferencing system, wherein the second user is not a user of the content management system;

identifying a registered user of the content management system and a file or folder corresponding to the drag-and-drop event, wherein the registered user is associated with a collaboration group;

retrieving, from the web conferencing system, a copy of the file or folder corresponding to the drag-and-drop event; and initiating a storing operation to store the copy of the file or folder into a file system of the content management system, wherein storage location permissions of the collaboration group associated with the registered user are propagated to store the file or folder when the second user of the web conferencing system is not registered with the content management system.

27. The non-transitory computer readable medium of claim 26, further comprising instructions which, when stored in memory and executed by the one or more processors causes the one or more processors to perform acts of:

determining, based on aspects of the web conferencing system, a directory hierarchy of a file system of the content management system.

28. The non-transitory computer readable medium of claim 27, further comprising instructions which, when stored in memory and executed by the one or more processors causes the one or more processors to perform acts of:

selecting a location within the directory hierarchy of the content management system; and storing at least a portion of the file or folder in the location.

29. The non-transitory computer readable medium of claim 26, further comprising instructions which, when stored in memory and executed by the one or more processors causes the one or more processors to perform acts of:

modifying file or folder permissions to make the copy of the file or folder available to participants of a web conference session for a limited duration after the web conference session has ended.

30. The non-transitory computer readable medium of claim 26, further comprising instructions which, when stored in memory and executed by the one or more processors causes the one or more processors to perform acts of:

dynamically generating, at the content management system, a user ID;

associating, at the content management system, the user ID to the second user of the web conferencing system, wherein the user ID is associated with the collaboration group with at least one registered user of the content management system, and the user ID inherits the storage location permissions of the at least one registered user of the content management system;

propagating the file or folder permissions to permit access to the copy of the file or folder by the second user associated with the user ID to store the copy of the file or folder.

* * * * *